(12) United States Patent
Chang et al.

(10) Patent No.: US 12,505,905 B2
(45) Date of Patent: Dec. 23, 2025

(54) METHOD AND SYSTEM FOR THE COMPUTER-AIDED PROCESSING OF MEDICAL IMAGES

(71) Applicant: RAD AI, Inc., San Francisco, CA (US)

(72) Inventors: Jeffrey Chang, Berkeley, CA (US); Doktor Gurson, Berkeley, CA (US); Joseph Zachary Allen, Berkeley, CA (US); Christopher Johnson, Berkeley, CA (US)

(73) Assignee: RAD AI, Inc., San Francisco, CA (US)

( * ) Notice: Subject to any disclaimer, the term of this patent is extended or adjusted under 35 U.S.C. 154(b) by 0 days.

(21) Appl. No.: 18/952,233

(22) Filed: Nov. 19, 2024

(65) Prior Publication Data

US 2025/0166764 A1 May 22, 2025

Related U.S. Application Data

(60) Provisional application No. 63/602,098, filed on Nov. 22, 2023.

(51) Int. Cl.
 *G16H 15/00* (2018.01)
 *G06F 40/40* (2020.01)
 (Continued)

(52) U.S. Cl.
 CPC ............. *G16H 15/00* (2018.01); *G06F 40/40* (2020.01); *G06T 7/0012* (2013.01); *G06V 10/77* (2022.01);
 (Continued)

(58) Field of Classification Search
 CPC ......... G06T 7/0012; G06T 2207/20081; G06T 2207/20084; G06T 7/136;
 (Continued)

(56) References Cited

U.S. PATENT DOCUMENTS 10,127,662 B1 11/2018 Reicher et al.
10,140,421 B1 11/2018 Bernard et al.
(Continued)

FOREIGN PATENT DOCUMENTS

CN 111414464 A 7/2020
CN 116364227 A * 6/2023
(Continued)

OTHER PUBLICATIONS

Li, J., Li, D., Savarese, S., & Hoi, S. (Jul. 2023). Blip-2: Bootstrapping language-image pre-training with frozen image encoders and large language models. In International conference on machine learning (pp. 19730-19742). PMLR (Year: 2023).*
(Continued)

*Primary Examiner* — Courtney Joan Nelson
(74) *Attorney, Agent, or Firm* — Jeffrey Schox

(57) ABSTRACT

Methods and systems described enable automatic generation of a significant portion of or all of a clinical report (e.g., radiology report), using multimodal models trained on image and language data. Methods described can transform unstructured language and image information into findings, as well as an accurate and comprehensive clinical report, in a designated style (e.g., writing style). The methods and systems described thus significantly improve performance in generation and processing of clinical reports, in relation to time saved per clinical shift, dictation effort, medical billing, and other performance factors.

15 Claims, 9 Drawing Sheets

(51) Int. Cl.
*G06T 7/00* (2017.01)
*G06V 10/77* (2022.01)

(52) U.S. Cl.
CPC . *G06T 2207/10116* (2013.01); *G06V 2201/03* (2022.01)

(58) Field of Classification Search
CPC ........... G06T 2207/30004; G06T 2207/10116; G16H 50/20; G16H 30/40; G16H 30/20; G16H 15/00; G16H 80/00; G16H 10/60; A61B 5/0013; G06V 2201/03; G06V 10/764; G06V 10/82; G06V 10/774; G06V 10/77; G06N 3/045; G06N 3/08; G06N 20/00; G06F 40/40
See application file for complete search history.

(56) References Cited

U.S. PATENT DOCUMENTS

| | | | |
|---|---|---|---|
| 10,395,772 | B1 | 8/2019 | Lucas et al. |
| 10,667,794 | B2 | 6/2020 | Beymer et al. |
| 11,064,902 | B2 | 7/2021 | Wallace et al. |
| 11,069,432 | B2 | 7/2021 | Guo et al. |
| 11,164,045 | B2 | 11/2021 | Paik et al. |
| 11,263,749 | B1 | 3/2022 | Purushottam et al. |
| 11,342,055 | B2 | 5/2022 | Chang et al. |
| 11,380,432 | B2 * | 7/2022 | Glottmann ............ G06T 7/0012 |
| 11,403,786 | B2 | 8/2022 | Farri et al. |
| 11,475,358 | B2 | 10/2022 | Edgar et al. |
| 11,610,667 | B2 | 3/2023 | Gurson et al. |
| 11,615,890 | B2 | 3/2023 | Chang et al. |
| 11,803,759 | B2 | 10/2023 | Hu et al. |
| 11,961,624 | B2 | 4/2024 | Smurro |
| 12,032,658 | B2 | 7/2024 | Kiraly et al. |
| 2003/0154085 | A1 | 8/2003 | Kelley |
| 2007/0078679 | A1 | 4/2007 | Rose |
| 2010/0138239 | A1 | 6/2010 | Reicher et al. |
| 2013/0290031 | A1 | 10/2013 | Kay et al. |
| 2014/0379378 | A1 | 12/2014 | Cohen-Solal et al. |
| 2015/0112725 | A1 | 4/2015 | Ryan |
| 2015/0348229 | A1 | 12/2015 | Aguirre-Valencia et al. |
| 2016/0364862 | A1 | 12/2016 | Reicher et al. |
| 2018/0060533 | A1 | 3/2018 | Reicher et al. |
| 2018/0322254 | A1 | 11/2018 | Smurro |
| 2018/0330828 | A1 | 11/2018 | Hayter |
| 2019/0021677 | A1 | 1/2019 | Grbic et al. |
| 2019/0122073 | A1 | 4/2019 | Ozdemir et al. |
| 2019/0139218 | A1 | 5/2019 | Song et al. |
| 2019/0156947 | A1 | 5/2019 | Nakamura et al. |
| 2019/0231288 | A1 | 8/2019 | Profio et al. |
| 2019/0362835 | A1 | 11/2019 | Sreenivasan et al. |
| 2020/0226481 | A1 | 7/2020 | Sim et al. |
| 2020/0311613 | A1 | 10/2020 | Ma et al. |
| 2020/0334416 | A1 | 10/2020 | Vianu et al. |
| 2020/0342967 | A1 | 10/2020 | Bronkalla et al. |
| 2020/0380675 | A1 | 12/2020 | Golden et al. |
| 2021/0005297 | A1 | 1/2021 | Oez |
| 2021/0035015 | A1 | 2/2021 | Edgar et al. |
| 2021/0090694 | A1 | 3/2021 | Colley et al. |
| 2021/0110912 | A1 | 4/2021 | Mukherjee |
| 2021/0216822 | A1 | 7/2021 | Paik et al. |
| 2021/0327596 | A1 | 10/2021 | Tahmasebi Maraghoosh et al. |
| 2021/0334462 | A1 | 10/2021 | Kukreja et al. |
| 2022/0020495 | A1 | 1/2022 | Sadeghi |
| 2022/0051771 | A1 | 2/2022 | Lyman et al. |
| 2022/0059200 | A1 | 2/2022 | Rahbar et al. |
| 2022/0246258 | A1 | 8/2022 | Chang et al. |
| 2022/0254464 | A1 | 8/2022 | Pinto |
| 2023/0051982 | A1 | 2/2023 | Sasidharan et al. |
| 2023/0079929 | A1 | 3/2023 | Bradski et al. |
| 2023/0145535 | A1 | 5/2023 | Hatamizadeh et al. |
| 2023/0197276 | A1 * | 6/2023 | Chang .................... G16H 40/67 705/3 |
| 2023/0289529 | A1 | 9/2023 | Alikaniotis et al. |
| 2024/0266074 | A1 | 8/2024 | Smurro |
| 2024/0347156 | A1 * | 10/2024 | Paulett ................... G16H 10/60 |

FOREIGN PATENT DOCUMENTS

| | | |
|---|---|---|
| CN | 117558439 A | 2/2024 |
| CN | 117995344 A | 5/2024 |
| CN | 118070227 A | 5/2024 |
| EP | 3246836 A1 | 11/2017 |
| WO | 0239415 A2 | 5/2002 |
| WO | 2019025601 A1 | 2/2019 |
| WO | 2020043673 A1 | 3/2020 |
| WO | 2020214683 A1 | 10/2020 |
| WO | 2022162167 A1 | 8/2022 |
| WO | 2022212771 A2 | 10/2022 |

OTHER PUBLICATIONS

Machine translation of CN 116364227 obtained from google patents (Year: 2023).*

"Improving and automating lung cancer screening", Nuance, Data Sheet, Nov. 2020, https://www.nuance.com/asset/en_us/collateral/healthcare/data-sheet/ds-powerscribe-lung-cancer-screening-en-us.pdf.

"Lung Cancer Orchestrator", Philips, first downloaded May 19, 2023, https://www.usa.philips.com/healthcare/product/HC841017/lung-cancer-orchestrator.

"Lung Cancer Screening", Eon Health, first downloaded May 19, 2023, https://eonhealth.com/lung-cancer-screening-software/.

"Merge Announces Release of Fusion PACS MX(TM) 3.0 Featuring Integrated Digital Mammography, and Release of Merge Mammo(TM) 7.10", Business Wire, May 19, 2008, p. NA. ProQuest. Web. Aug. 29, 2023. (Year: 2008).

"PowerScribe One for radiology reporting, Next-generation radiology reporting", Nuance, https://www.nuance.com/healthcare/diagnostics-solutions/workflow-radiology-reporting/powerscribe-one.html#, first downloaded Mar. 11, 2024.

"Radiology reports designed for patients", Scanslated, first downloaded May 19, 2023, https://scanslated.com.

Agarwal, Sheela, et al., "Beyond the impression: How AI-driven clinical intelligence transforms the radiology experience", Radiology Business Journal sponsored webinar, Nov. 16, 2022.

Chang, Jeffrey, et al., "Method and System for the Computer-Aided Processing of Medical Images", U.S. Appl. No. 18/952,233, filed Nov. 19, 2024.

Chang, Jeffrey, et al., "Method and System for the Computer-Assisted Implementation of Radiology Recommendations", U.S. Appl. No. 18/215,354, filed Jun. 28, 2023.

Chang, Jeffrey, et al., "System and Method for Automatically Displaying Information at a Radiologist Dashboard", U.S. Appl. No. 18/952,147, filed Nov. 19, 2024.

Dai, Ning, et al., "Style transformer: Unpaired text style transfer without disentangled latent representation", Ithaca: Cornell University Library, arXiv.org. (Year: 2019).

Deng, Mingkai, "RLPrompt: Optimizing Discrete Text Prompts with Reinforcement Learning", Machine Learning, Carnegie Mellon University, published Feb. 24, 2023.

Ebesu, Travis Akira, "Deep learning for recommender systems", (Order No. 13900137). Available from ProQuest Dissertations & Theses Global. (2293976827). (Year: 2019).

Garud, Hrishkesh Deepak, et al., "Transforming human pose forecasting", (Order No. 27814956). Available from ProQuest Dissertations & Theses Global. (2399247743). (Year: 2019).

Jettaku, Amarin, et al., "Relation extraction between bacteria and biotopes from biomedical texts with X attention mechanisms and domain-specific contextual representations", BMC Bioinformatics, 20, 1-17, (2019).

Koncel-Kedziorski, Rik, et al., "Understanding and generating multi-sentence texts", (Order No. 13814316). Available from ProQuest Dissertations & Theses Global. (2305944561). (Year: 2019).

(56) References Cited

OTHER PUBLICATIONS

Lambert, Nathan, et al., "Illustrating Reinforcement Learning from Human Feedback (RLHF)", Hugging Face, https://huggingface.co/blog/rlhf, published Dec. 9, 2022.
Lou, Robert, et al., "Automated detection of radiology reports that require follow-up imaging using natural language processing feature engineering and machine learning classification", Journal of digital imaging, 33(1), 131-136. (Year: 2020).
Lu, Edward, et al., "LORA: Low-Rank Adaptation of Large Lan-Guage Models", arXiv:2106.09685, https://doi.org/10.48550/arXiv.2106.09685, Jun. 17, 2021.
Malhotra, Tanya, "Exploring The Differences Between ChatGPT/GPT-4 and Traditional Language Models: The Impact of Reinforcement Learning from Human Feedback (RLHF)", MarkTestPost, https://www.marktechpost.com/2023/03/21/exploring-the-differences-between-chatgpt-gpt-4-and-traditional-language-models-the-impact-of-reinforcement-learning-from-human-feedback-rlhf/, Mar. 21, 2023.
Nandhakumar, Nidhin, et al., "Clinically Significant Information Extraction from Radiology Report", DocEng '17: Proceedings of the 2017 ACM Symposium on Document Engineering, Aug. 2017, pp. 153-162.
Paulett, John, et al., "System and Method for Radiology Reporting", U.S. Appl. No. 18/638,368, filed Apr. 17, 2024.
Sanjabi, Nima, "Abstractive text summarization with attention-based mechanism", (Projecte Final de Master Oficial). UPC, Facultat d'Informatica de Barcelona. (Year: 2018).
Sean, Xiao, "Fine-tuning LLMs Made Easy with LoRA and Generative AI-Stable Diffusion LoRA", Medium, https://xiaosean5408.medium.com/fine-tuning-llms-made-easy-with-lora-and-generative-ai-stable-diffusion-lora-39ff27480fda, Mar. 11, 2023.
Song, Huan, "Data-driven representation learning in multimodal feature fusion", (Order No. 10838232). Available from ProQuest Dissertations & Theses Global. (2094858110). (Year: 2018).
Van Veen, Dave, et al., "RadAdapt: Radiology Report Summarization via Lightweight Domain Adaptation of Large Language Models", arXiv:2305.01146, https://doi.org/10.48550/arXiv.2305.01146, May 2, 2023.
Witteveen, Sam, "Building a Summarization System with LangChain and GPT-3—Part 2", https://www.youtube.com/watch?v=d-yeHDLgKHw, Mar. 11, 2023.
Xu, Shawn, et al., "ELIXR: Towards a general purpose X-ray artificial intelligence system through alignment of large language models and radiology vision encoders", arXiv:2308.01317 [cs.CV], Aug. 2, 2023.
Xue, Y., et al., "Multimodal Recurrent Model with Attention for Automated Radiology Report Generation", Medical Image Computing and Computer Assisted Intervention—MICCAI 2018. MICCAI 2018. Lecture Notes in Computer Science, vol. 11070. Springer, Cham. https://doi.org/10.1007/978-3-030-00928-1_52 (Year: 2018).
Yao, Shunyu, et al., "ReAct: Synergizing Reasoning and Acting in Language Models", https://react-lm.github.io, Oct. 6, 2022.
Zech, John, et al., "Natural Language-based Machine Learning Models for the Annotation of Clinical Radiology Reports", Radiology Reports. Jan. 30, 2018 (Jan. 30, 2018).
Zhang, Yuhao, et al., "Learning to Summarize Radiology Findings", Oct. 8, 2018 (Oct. 8, 2018). 1-20 [retrieved on Nov. 18, 2020].
Chang, et al., "Method and System for the Computer-Assisted Implementation of Radiology Recommendations", U.S. Appl. No. 19/174,282, filed Apr. 9, 2025.
Li, Junnan, et al., "BLIP-2: Bootstrapping Language-Image Pre-training with Frozen Image Encoders and Large Language Models", arXiv:2301.12597v1, Jan. 30, 2023.
Chadha, Aman, "Exploring the Art of Artificial Intelligence One Concept at a Time", aman.ai, https://aman.ai/, first downloaded Jun. 7, 2023.
Li, et al., "BLIP-2: Bootstrapping Language-Image Pre-training with Frozen Image Encoders and Large Language Models", arXiv:2301.12597v1, Jan. 30, 2023.

* cited by examiner

| Reporting 🎤 ▼ (X-Rays) (Patient) (Wheezing) | | | Study Browser |
|---|---|---|---|
| Fields<br><br>Procedure<br>History<br>Technique<br>Comparison<br>Support Lines<br>Lungs<br>Pleura<br>Cardiovascular<br>Skeleton<br>Additional Findings | Symptom<br>Wheezing<br><br>Technique<br>PA and lateral views of the chest<br><br>Comparison<br>None<br><br>Findings<br>Sternotomy wires present<br><br>Lungs and Pleura<br>Hyperinflated lungs, consistent with COPD. Atelectasis in the night lung base. Irregular density in the right suprahilar region, with Distortion from underlying disease. Small left effusion with possible Consolidation<br><br>Cardiovascular and Mediastinum<br>Mild enlargement of mediastinal Silhouette. Possible enlargement Of the pulmonary arteries<br><br>Skeleton/Other<br>No abnormalities<br><br>Impression:<br>COPD, Small left effusion, Irregular Density | Study<br><br>Model<br>Output<br><br><br>Templates | IMAGE<br><br>IMAGE<br><br>Set of Images |
| | Priors \| Document Tree | | |

FIGURE 5

METHOD AND SYSTEM FOR THE COMPUTER-AIDED PROCESSING OF MEDICAL IMAGES

CROSS-REFERENCE TO RELATED APPLICATIONS

This application claims the benefit of U.S. Provisional Application No. 63/602,098, filed 22 Nov. 2023, which is incorporated in its entirety by this reference.

TECHNICAL FIELD

This invention relates generally to the radiology and imaging fields, and more specifically to a new and useful system and method for the automated processing of medical images in the radiology and imaging fields.

BRIEF DESCRIPTION OF THE FIGURES

FIG. 5 depicts an example of a user interface of a platform for report requesting, report modification, and/or querying, in relation to computer-aided processing of medical images.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
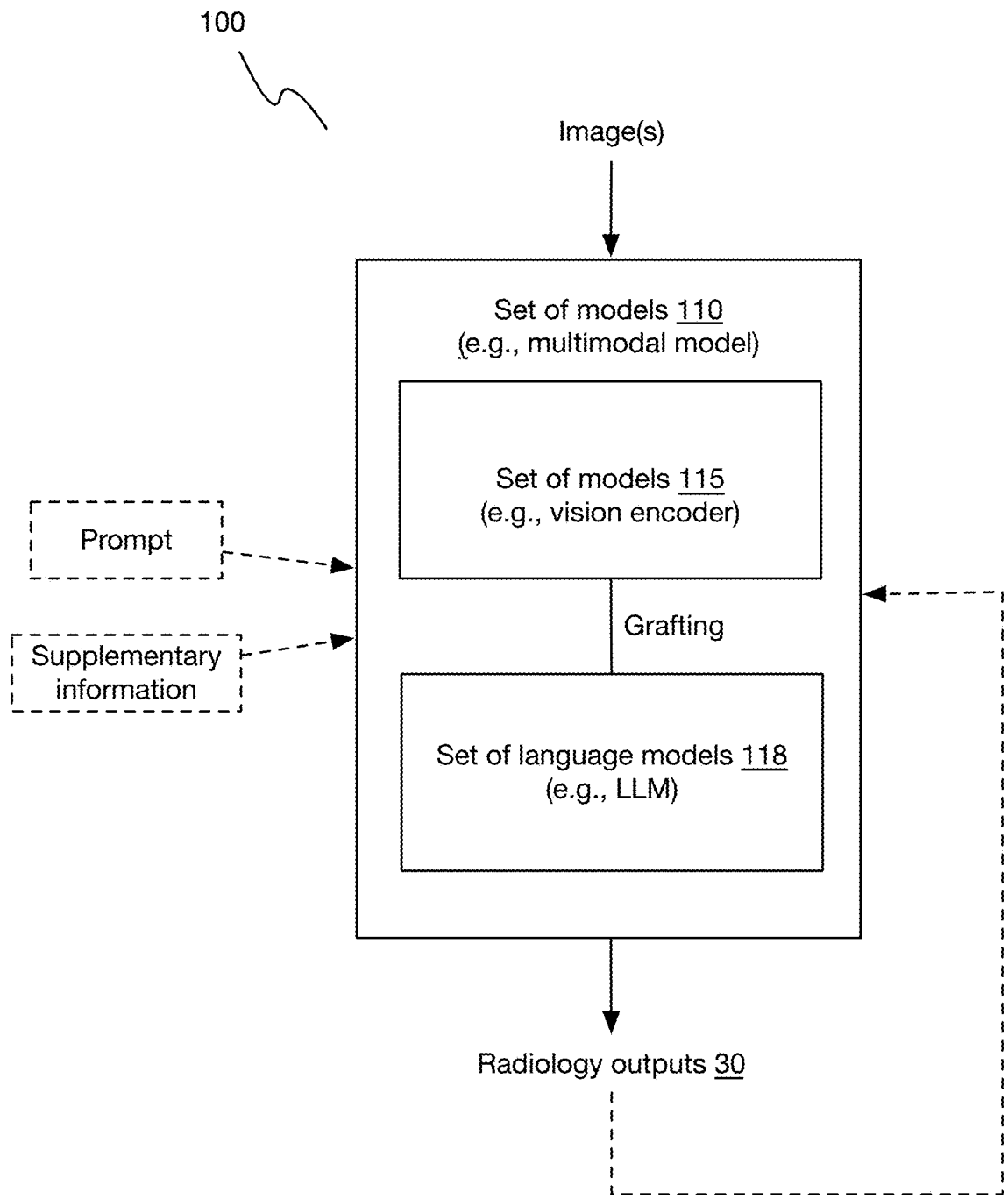
FIG. 1A depicts a schematic of an embodiment of a system for the computer-aided processing of medical images.
Figure 1B:
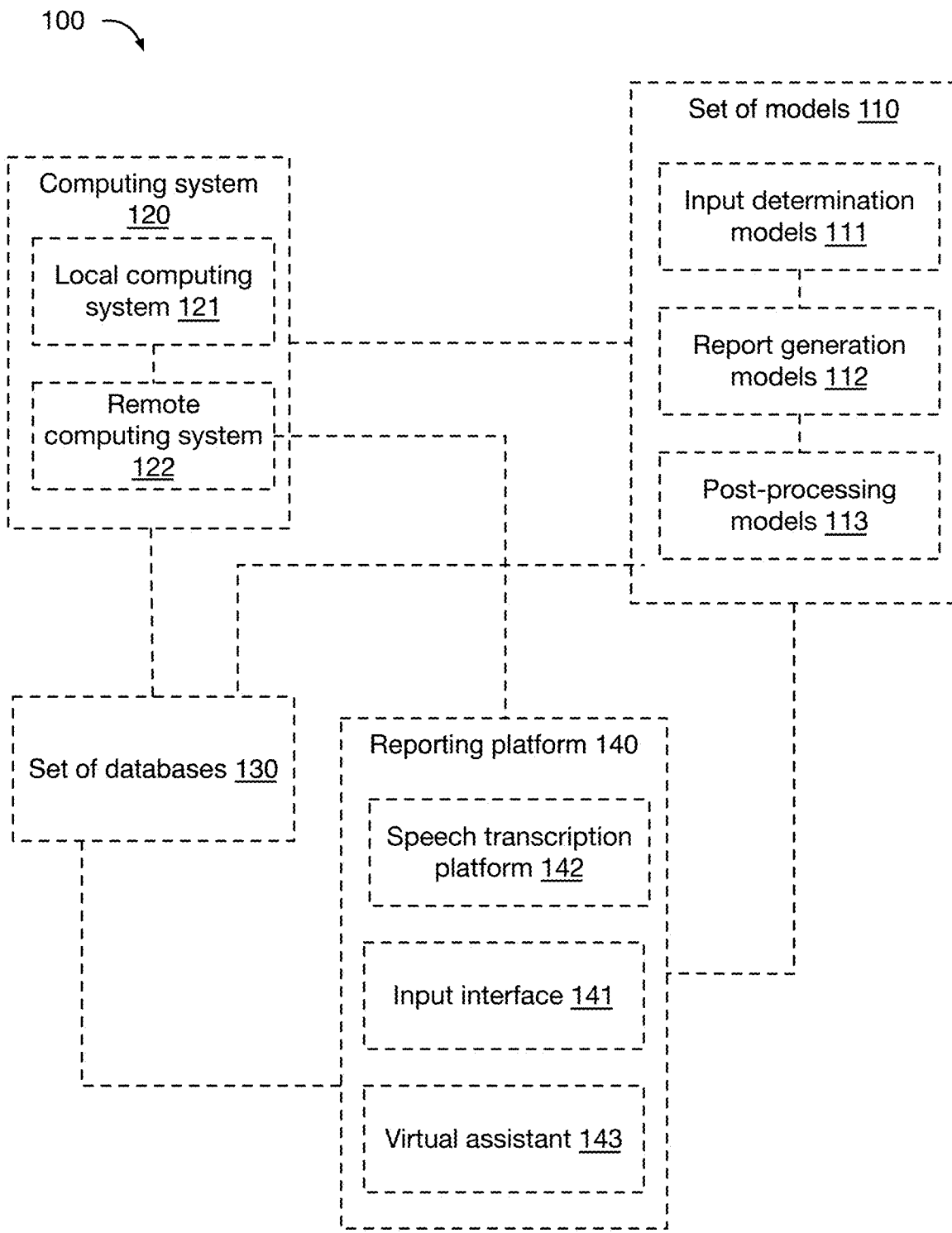
FIG. 1B depicts a schematic of a variation of a system for the computer-aided processing of medical images.

As shown in FIGS. 1A and 1B, a system 100 for the computer-aided processing of medical images includes a set of models, the set of models including a set of image models and a set of language models. Additionally or alternatively, the system can include any or all of the components as described in any or all of: U.S. application Ser. No. 16/688,623, filed 19 Nov. 2019; U.S. application Ser. No. 17/020,593, filed 14 Sep. 2020; U.S. application Ser. No. 17/690,751, filed 9 Mar. 2022; U.S. application Ser. No. 18/215,354, filed 28 Jun. 2023; U.S. application Ser. No. 17/649,213, filed 28 Jan. 2022; U.S. application Ser. No. 18/374,535, filed 28 Sep. 2023; and U.S. application Ser. No. 18/374,526, filed 28 Sep. 2023, each of which is incorporated in its entirety by this reference.

As shown in FIG. 2, a method 200 for computer-aided processing of medical images includes: receiving a set of images S100; transforming the set of images into a set of intermediate representations S200; and producing radiology outputs based on the set of intermediate representations S300. Additionally or alternatively, the method 200 can include integrating a prompt and/or supplementary information into the set of intermediate representations S250; training and/or retraining a set of models S005; and/or any other processes. Further additionally or alternatively, the method 200 can include or interface with any or all of the processes as described in any or all of: U.S. application Ser. No. 16/688,623, filed 19 Nov. 2019; U.S. application Ser. No. 17/020,593, filed 14 Sep. 2020; U.S. application Ser. No. 17/690,751, filed 9 Mar. 2022; U.S. application Ser. No. 18/215,354, filed 28 Jun. 2023; U.S. application Ser. No. 17/649,213, filed 28 Jan. 2022; U.S. application Ser. No. 18/374,535, filed 28 Sep. 2023; and U.S. application Ser. No. 18/374,526, filed 28 Sep. 2023, each of which is incorporated in its entirety by this reference, or any other suitable processes performed in any suitable order. The method 200 can be performed with a system 100 as described above and/or any other suitable system.

2. Benefits

The system and method for the computer-aided processing of medical images can confer several benefits over current systems and methods.

In a first variation, the technology confers the benefit of decreasing the time, effort, and/or workload involved in a radiologist completing a radiology report through the automation of any or all processes involved in the report composition. This can further enable any or all of: additional time for the radiologist to perform complex analyses, additional imaging exams that the radiologist can analyze in a set period of time, a decrease in a number of radiologists needed at certain points of time (e.g., undesirable hours, surges in cases, etc.), and/or any other outcomes. Exemplary performance improvements attributed to the systems and methods described are provided below.

In a second variation, the technology confers the benefit of improving an accuracy and/or comparability of radiology reports through the processing of images with a unified model (e.g., multimodal model) workflow, the unified model workflow configured to process images of varying types and associated with various findings (or other radiology outputs). In a set of examples, for instance, the model workflow is configured to process images of various different anatomical regions and/or types and further configured to reliably determine various types of radiology findings without requiring individual models configured for each type of finding. In variations, the multimodal models described vastly expand capabilities of artificial intelligence systems for medical imaging applications, where traditional models rely primarily upon vision models (e.g., convolutional neural networks (CNNs), vision models, etc.). Such models traditionally rely upon a fully supervised approach, resulting in time-consuming and expensive training requirements that involve large quantities of data that is annotated by experts. Traditional non-multimodal models are also typically limited to performance of specific tasks (e.g., classification, detection, segmentation, etc.), and accept singular input types (e.g., specific image types).

In a third variation, the technology confers an improvement to machine learning and specifically the training of a set of multiple models together, the multiple models associated with different input types, architectures, and/or output types, where the combined training functions to increase a quality (e.g., accuracy, intelligibility, usefulness, relevance, etc.) of the produced outcome. In conventional workflows, for instance, image-based models (e.g., models that process images and/or image representations [e.g., multi-dimensional tensors]) and language-based models (e.g. models that produce language outputs) are trained individually, which can lead to a non-optimal interfacing between these models if they were to hypothetically be combined. In examples of the system and method, an image-based model is trained together (e.g., with a supervised learning process, with a semi-supervised learning process, with an unsupervised learning process, etc.) with a language-based model. In a particular specific example, a transformer model (e.g., Q-former) that receives image representation information (e.g., multi-dimensional tensor of embeddings) is trained together with a language model (e.g., large language model [LLM]), which improves the transformer's translation capabilities and improves the language model's ability to adapt to both the language it is being asked to produce and any nuances of the transformer model in how it produces its outputs and/or with the outputs themselves. This can further confer the benefit of increasing an ease with which these models are updated (e.g., retrained).

In a fourth variation, the technology confers the benefit of continuously improving a performance of the set of models through the iterative retraining of any or all models (e.g., each time the method is performed), such as through the automated retraining of the models as additional data is received and/or additional outputs (e.g., radiology reports) are produced.

Additionally or alternatively, the system and method can confer any other benefit.

3. System

As shown in FIGS. 1A and 1B, a system 100 for the computer-aided processing of medical images includes a set of models 110, the set of models including a multimodal model comprising at least one language model 118 (e.g., large language model, LLM). As shown in FIG. 1B, the system 100 can include and/or interface with any or all of: one or more models 110, a computing system 120, a set of databases 130, a user interface (e.g., referred to equivalently herein as an "input interface"), a reporting platform 140, user devices, and/or any other suitable system components. The multimodal model of the system 100 can include an encoder/decoder model that can accept an image data input, or a decoder-only model that can accept an image data input. In variations and examples, the model can be an image model 115 (e.g., vision model), as shown in FIG. 1B. The system 100 is structured to perform functions described herein, and embodiments, variations, and examples of the system 100 can also be used to specifically identify negative (e.g., normal or mostly normal) imaging exams, to return negative reports, and to return negative results, across all imaging modalities. As such, report automation from images, performed using the system 100 according to methods described, can involve identification and completion of negative exams and negative reports.

Additionally or alternatively, the system can include any or all of the components as described in any or all of: U.S. application Ser. No. 16/688,623, filed 19 Nov. 2019; U.S. application Ser. No. 17/020,593, filed 14 Sep. 2020; U.S. application Ser. No. 17/690,751, filed 9 Mar. 2022; U.S. application Ser. No. 18/215,354, filed 28 Jun. 2023; U.S. application Ser. No. 17/649,213, filed 28 Jan. 2022; U.S. application Ser. No. 18/374,535, filed 28 Sep. 2023; and U.S. application Ser. No. 18/374,526, filed 28 Sep. 2023, each of which is incorporated in its entirety by this reference.

The system 100 functions to automatically produce a set of radiology outputs 30 that can be utilized (e.g., by a radiologist, by additional automated processes, etc.) to increase an efficiency with which a radiology report can be prepared. Additionally or alternatively, the system 100 can function to: increase an accuracy, comprehensiveness, or other metric(s) of a produced radiology report; produce an entire radiology report and/or preliminary radiology report (e.g., radiology report without impression section, draft radiology report, etc.); and/or otherwise suitably function.

In embodiments, variations, and examples, the system 100 includes multimodal model including large language model (LLM) architecture that can improve functionality of clinical report systems (e.g., radiology report systems), in relation to workflow performance enhancements. The multimodal model can include an encoder/decoder model that can accept an image data input, or a decoder-only model that can accept an image data input. In variations and examples, the model can be an image model 115 (e.g., vision model), as shown in FIG. 1B.

In examples, dictation reduction performance can be attributed to the system 100, whereby dictation reduction performance can include: dictation of 20% fewer words by clinicians/radiologists (e.g., in order to generate a report from a clinical session), dictation of 22% fewer words by clinicians/radiologists (e.g., in order to generate a report from a clinical session), dictation of 24% fewer words by clinicians/radiologists (e.g., in order to generate a report from a clinical session), dictation of 26% fewer words by clinicians/radiologists (e.g., in order to generate a report from a clinical session), dictation of 28% fewer words by clinicians/radiologists (e.g., in order to generate a report from a clinical session), dictation of 30% fewer words by clinicians/radiologists (e.g., in order to generate a report from a clinical session), dictation of 32% fewer words by clinicians/radiologists (e.g., in order to generate a report from a clinical session), dictation of 34% fewer words by clinicians/radiologists (e.g., in order to generate a report from a clinical session), dictation of 36% fewer words by clinicians/radiologists (e.g., in order to generate a report from a clinical session), dictation of 38% fewer words by clinicians/radiologists (e.g., in order to generate a report from a clinical session), dictation of 40% fewer words by clinicians/radiologists (e.g., in order to generate a report from a clinical session), dictation of 42% fewer words by clinicians/radiologists (e.g., in order to generate a report from a clinical session), dictation of 44% fewer words by clinicians/radiologists (e.g., in order to generate a report from a clinical session), dictation of 46% fewer words by clinicians/radiologists (e.g., in order to generate a report from a clinical session), dictation of 48% fewer words by clinicians/radiologists (e.g., in order to generate a report from a clinical session), dictation of 50% fewer words by clinicians/radiologists (e.g., in order to generate a report from a clinical session), or a lower percentage of words dictated by clinicians/radiologists (e.g., in order to generate a report from a clinical session).

In examples, increased speed performance can be attributed to the system 100, whereby increased speed performance can include: 30 minutes saved (e.g., per clinical shift, per caretaking shift, per radiologist shift), thus providing ~6% improved speed in relation to standard systems; 35 minutes saved (e.g., per clinical shift, per caretaking shift, per radiologist shift), thus providing ~7% improved speed in relation to standard systems; 40 minutes saved (e.g., per clinical shift, per caretaking shift, per radiologist shift), thus providing ~8% improved speed in relation to standard systems; 45 minutes saved (e.g., per clinical shift, per caretaking shift, per radiologist shift), thus providing ~9% improved speed in relation to standard systems; 50 minutes saved (e.g., per clinical shift, per caretaking shift, per radiologist shift), thus providing ~10% improved speed in relation to standard systems; 55 minutes saved (e.g., per clinical shift, per caretaking shift, per radiologist shift), thus providing ~11% improved speed in relation to standard systems; 60 minutes saved (e.g., per clinical shift, per caretaking shift, per radiologist shift), thus providing ~12% improved speed in relation to standard systems; 65 minutes saved (e.g., per clinical shift, per caretaking shift, per radiologist shift), thus providing ~13% improved speed in relation to standard systems; 70 minutes saved (e.g., per clinical shift, per caretaking shift, per radiologist shift), thus providing ~14% improved speed in relation to standard systems; 75 minutes saved (e.g., per clinical shift, per caretaking shift, per radiologist shift), thus providing ~15% improved speed in relation to standard systems; 80 minutes saved (e.g., per clinical shift, per caretaking shift, per radiologist shift), thus providing ~16% improved speed in relation to standard systems; or greater speed performance.

In examples, detection sensitivity performance is also attributed to the system 100. In examples, the system 100 provided: greater than 70% sensitivity (e.g., in detection of a clinical indication, such as an intracranial hemorrhage), greater than 71% sensitivity (e.g., in detection of a clinical indication, such as an intracranial hemorrhage), greater than 72% sensitivity (e.g., in detection of a clinical indication, such as an intracranial hemorrhage), greater than 73% sensitivity (e.g., in detection of a clinical indication, such as an intracranial hemorrhage), greater than 74% sensitivity (e.g., in detection of a clinical indication, such as an intracranial hemorrhage), greater than 75% sensitivity (e.g., in detection of a clinical indication, such as an intracranial hemorrhage), greater than 76% sensitivity (e.g., in detection of a clinical indication, such as an intracranial hemorrhage), greater than 77% sensitivity (e.g., in detection of a clinical indication, such as an intracranial hemorrhage), greater than 78% sensitivity (e.g., in detection of a clinical indication, such as an intracranial hemorrhage), greater than 79% sensitivity (e.g., in detection of a clinical indication, such as an intracranial hemorrhage), greater than 80% sensitivity (e.g., in detection of a clinical indication, such as an intracranial hemorrhage), greater than 85% sensitivity (e.g., in detection of a clinical indication, such as an intracranial hemorrhage), greater than 90% sensitivity (e.g., in detection of a clinical indication, such as an intracranial hemorrhage), or greater sensitivity.

In examples, detection specificity performance is also attributed to the system 100. In examples, the system 100 provided: greater than 80% specificity (e.g., in detection of a clinical indication, such as an intracranial hemorrhage), greater than 82% specificity (e.g., in detection of a clinical indication, such as an intracranial hemorrhage), greater than 84% specificity (e.g., in detection of a clinical indication, such as an intracranial hemorrhage), greater than 86% specificity (e.g., in detection of a clinical indication, such as an intracranial hemorrhage), greater than 88% specificity (e.g., in detection of a clinical indication, such as an intracranial hemorrhage), greater than 90% specificity (e.g., in detection of a clinical indication, such as an intracranial hemorrhage), greater than 92% specificity (e.g., in detection of a clinical indication, such as an intracranial hemorrhage), greater than 94% specificity (e.g., in detection of a clinical indication, such as an intracranial hemorrhage), greater than 96% specificity (e.g., in detection of a clinical indication, such as an intracranial hemorrhage), greater than 98% specificity (e.g., in detection of a clinical indication, such as an intracranial hemorrhage), or greater specificity.

The radiology outputs preferably include at least a set of findings (e.g., positive findings, negative findings, pertinent positive findings, pertinent negative findings, normal findings, abnormal findings, description of findings, etc.), but can additionally or alternatively include: any section or sections of a radiology report; any language used in or used to produce a radiology report; an entire report; a set of metrics used in a radiology report; any other language (e.g., words, sentences, strings of words, etc.); and/or any other outputs.

The system 100 includes a set of models 110, which function to perform any or all of the processing, generation, training, re-training, transmission, action execution, and/or other steps in the method 200 (e.g., as described below). Variations of models can include input determination models 111, report generation models 112 (e.g., language model), post-processing models 113, and/or any other model. The models can include architecture for machine learning approaches, classical or traditional approaches, and/or be otherwise configured. The models can include regression, decision tree, LSA, clustering, association rules, dimensionality reduction, neural networks (e.g., CNN; DNN; CAN; LSTM; RNN such as LSTM, GRU, etc.; FNN; encoders; decoders; deep learning models; transformers; etc.), ensemble methods, optimization methods, classification, rules, heuristics, equations (e.g., weighted equations, etc.), selection (e.g., from a library), regularization methods (e.g., ridge regression), Bayesian methods (e.g., Naiive Bayes, Markov), instance-based methods (e.g., nearest neighbor), kernel methods, support vectors (e.g., SVM, SVC, etc.), statistical methods (e.g., probability), comparison methods (e.g., ranking, similarity, matching, distance metrics, thresholds, etc.), deterministics, genetic programs, and/or any other suitable model. The models can include (e.g., be constructed using): a set of input layers (e.g., encoders), output layers (e.g., decoders such as beam search decoders), and/or hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); attention mechanisms (e.g., sequence-to-sequence architecture; a set of attention layers and/or self-attention layers; etc.); and/or have any other suitable architecture.

Models can be trained (e.g., pre-trained, retrained, tuned, fine-tuned, etc.), learned, fit, predetermined, untrained, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation, backpropagation, and/or otherwise generated. For example, models can be trained based on historical radiology reports (e.g., annotated radiology reports), manually generated radiology reports, synthesized radiology reports, labeled data, unlabeled data, positive training sets, negative training sets, and/or any other suitable set of data. Models can optionally be trained and/or undergo post-processing using: an additional model (e.g., a first model is used to teach a second model), autonomous agents (e.g., while models interact with each other), and/or any other model interactions.

The set of models 110 preferably includes a 1st subset of models, the 1st subset of models including a set of models (e.g., encoder/decoder models that can accept image data inputs, decoder-only models that can accept image data inputs, vision models, trained transformers, deep learning transformers, machine learning transformers, neural networks, recurrent neural networks, etc.), wherein the set of models are collectively configured to translate image-based information into a representation that can be processed by a language-based model (e.g., LLM, natural language model, etc.), wherein this translation, along with the processing of the language model ultimately produces language that can be integrated into a radiology report.

The set of image models preferably includes multiple transformers, such as a 1st and 2nd transformer, but can additionally or alternatively include more than 2 transformers, a single transformer, or any other model type(s). In variants including multiple transformers, the transformers can be different (e.g., have different architectures), the same (e.g., have the same architecture), or any combination.

Figure 3:
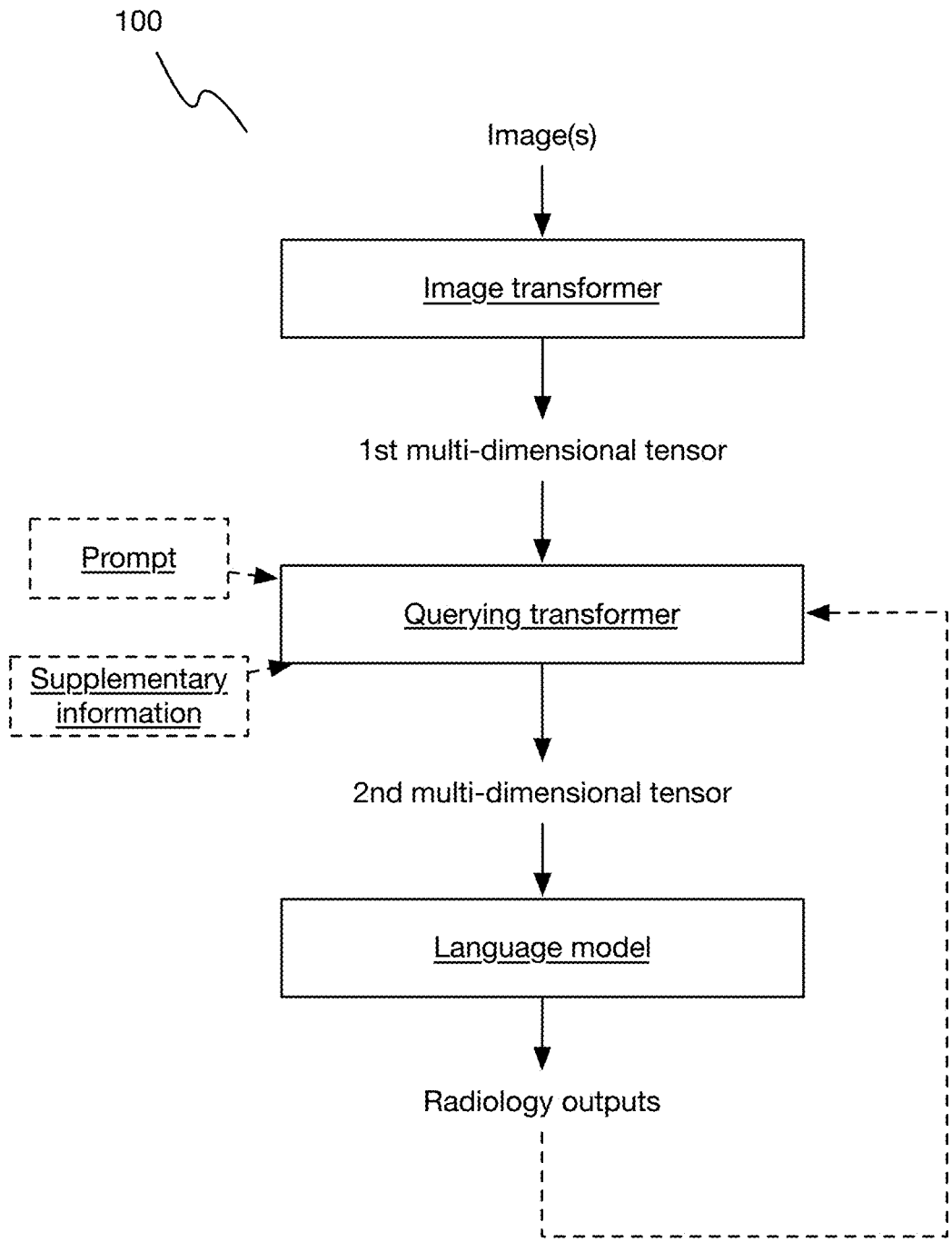
FIG. 3 depicts a variant of a system for the computer-aided processing of medical images.

In a set of preferred variants, the set of image models includes a 1st transformer, where the 1st transformer is an image-based transformer configured to translate image information (e.g., raw images, pixel representations of image(s), etc.) into a multi-dimensional tensor of embeddings, where the embeddings characterize information about the images (e.g., anatomical locations, pathology locations, pathology sizes and/or feature information, etc.); and a 2nd transformer, where the 2nd transformer is a Querying Transformer (equivalently referred to herein as a Query Transformer and/or a Q-Former) (e.g., as shown in FIG. 3) configured to: translate the embeddings from the 1st transformer into a representation that integrates information (e.g., prompt, supplementary information, etc.) informing the type and/or content of the radiology output(s), and translates the initial representation into one which can be interpreted by a language model.

Additionally or alternatively, the image models can include other models and/or be otherwise suitably configured.

The set of models 110 preferably includes a set of one or more language models configured for natural language processing and/or to produce language (e.g., words, text, strings of text, sentences, etc.) (e.g., as part of a natural language processing [NLP] task) that can be used in and/or form a radiology report. In a specific example, models can include: one or more transformers and/or transformer systems (e.g., Bidirectional Encoder Representations from Transformers [BERT], Generative Pre-Trained Transformer [GPT], etc.); a transformer with any suitable number and/or arrangement of encoders and decoders (e.g., arranged in a sequential and/or parallel arrangement); and/or any other suitable transformers or models. In a second specific example, models can include: one or more non-transformer based models (e.g., deep learning-based models such as Mamba, sequence modeling techniques, state space models, etc.); and/or any other large language models and/or other suitable models.

In preferred variants, the language model includes an LLM, wherein the LLM includes one or more transformers. Additionally or alternatively, the language model can include multiple models (e.g., multiple LLMs, multiple LLMs applied in series, etc.) and/or any other models.

Additionally or alternatively, the set of models can include any other models.

In variations, the set of models 110 includes a multimodal model.

In variations and examples, the multimodal model can include a large language model (LLM) and a vision encoder structured as a language-aligned image encoder integrated, by way of an adapter, onto a fixed LLM. The multimodal model of the system 100 is structured to receive a diverse set of inputs (e.g., dictation data, text data, images, audio, etc.), and is trained and re-trained across diverse input types simultaneously. The multimodal models described also integrate advanced vision models with LLM architecture, which involve transformer-based artificial intelligence (AI) models that are trained and re-trained on large datasets and can generalize to a range of clinical tasks (e.g., zero-shot image-to-text generation upon receipt of natural language instruction inputs). Training of such models addresses limitations of vision-only models and are trained on multimodal data (e.g., clinical images with paired free-text reports that meet various accuracy and billing standards). Multimodal model structures described are capable of generating solutions associated with the long-tails of diagnoses in the clinical domain and/or outside of the clinical domain. In particular, long-tails of diagnoses describe situations where a small number of conditions are routinely observed, but the majority are rare.

In the specific example, the LLM can include a version of the Pathways Language Model (e.g., PaLM, PaLM2, etc.). Variations of the LLM can include a version of a Language Model for Dialogue Applications (LaMDA), a Gemini model (e.g., a decoder-only transformer), a GPT model, a Llama model, a GLM model, a Claude model, a Reka Flash model, a Qwen model, a Grok model, a Molmo model, a Jamba model, a DeepSeek Coder model, an Athene model, a Phi-3 model, a Command-R-Plus model, an InternLM model, a Yi-Large model, a Mixtral of Experts model, a Gemma model, a Nemotron model, and/or another suitable model.

The multimodal model can have a context length of: up to 3,000,000 tokens, up to 2,000,000 tokens, up to 1,000,000 tokens, up to 500,000 tokens, up to 100,000 tokens, up to 90,000 tokens, up to 80,000 tokens, up to 70,000 tokens, up to 60,000 tokens, up to 50,000 tokens, up to 40,000 tokens, up to 35,000 tokens, up to 33,000 tokens, up to 30,000 tokens, up to 25,000 tokens, or another suitable number of tokens. Each context window can contain multiple forms of input, and different modes can be interleaved without requirement to be presented in a fixed order, allowing for a multimodal conversation. Input images can be of different resolutions. The multimodal model can have sparse mixture-of-experts architecture.

In specific examples, the multimodal model can be trained and re-trained (e.g., with generated outputs) using image data (e.g., from various types of images described) paired with corresponding free-text clinical reports (e.g., radiology reports), where the clinical reports include reports generated by clinicians (e.g., radiologists) and/or modified by clinicians post-automatic generation of a candidate report. Classification evaluation was performed on image and report datasets. In the specific example, classification performance was extremely high-performing (e.g., area under curve (AUC) values of greater than 0.8). The exemplary multimodal model required orders of magnitude (e.g., 2 orders of magnitude, 3 orders of magnitude) less data to achieve similar performance to supervised contrastive learning models.

In variations, the multimodal model also efficiently trained and re-trained, in comparison to training/tuning of an LLM, by way of the fixed LLM and vision encoder architecture of the multimodal model. Training can be performed using image datasets paired with free-text clinical reports (e.g., radiology reports), leveraging routinely collected data (and not requiring manual labelling of data). Re-training can be performed using image datasets paired with automatically generated free-text clinical reports (e.g., radiology reports) that have been modified by a clinical entity (e.g., radiologist) prior to release.

In a specific example, the multimodal model of the set of models 110 of the system can be trained in stages. In a first stage of training (depicted in FIG. 2C), the multimodal model is trained using a contrastive learning with language-image pre-training operation, a neural network approach. In the first stage of training, a training dataset including image datasets paired with free-text clinical reports is processed, whereby image datasets are passed as inputs to an image encoder to generate a set of image embeddings, in parallel with passing the paired free-text clinical reports as inputs to a language encoder to generate a set of text embeddings. Image data can be augmented (e.g., resized, flipped, rotated, etc.) in relation to generation of image embeddings. A dataset classifier is then created from label text, and used for zero-shot prediction of test image data. Training can involve a learning rate (e.g., Stochastic gradient descent (SGD) constant learning rate was set to 0.0001, set to another value), a momentum (e.g., a momentum of 0.98, a momentum of 0.99), a number of training steps (e.g., 70,000 steps, 80,000 steps, 90,000 steps, etc.), and/or other training metrics. The first stage of training utilizes a contrastive loss function, which drives image datasets (e.g., image representations) and associated generated clinical reports (e.g., radiology reports) closer in a high-dimensional space, and drives apart mismatched image datasets (e.g., image representations) and text (e.g., unrelated reports). The first stage of training thus utilizes radiology reports to align pre-trained supervised contrastive learning-based, vision-only model with a language encoder. Variations of training according to a first phase can additionally or alternatively involve use of a UNITER convolutional neural network model architecture, masked language model architecture, image text matching architecture, or other suitable architecture.

In a second stage of training (depicted in FIG. 2D), the multimodal model is trained using bootstrapping language-image pre-training architecture, where a second representation of the multimodal model of the second stage of training is built directly upon a first representation (e.g., first trained) of the multimodal model of the first stage of training. The second stage of training is configured to extract location-aware features from the unpooled spatial image embedding space of the first stage of training, and then to map them onto the language token space of the fixed LLM. The second representation of the multimodal model of the second stage of training functions as an adapter between the image encoder and the fixed LLM, and passes information between the image encoder(s) and the language encoder(s) of the multimodal model architecture by way of an attention mechanism. The second stage of training can include multiple phases. A first phase, as shown in FIG. 2C, can involve vision-language representation learning whereby the vision-language model (e.g., Q-former) is trained to understand images and reports in a shared embedding space (e.g., a Q-former comprising a shared embedding space) by executing image-text contrastive learning, image-grounded text generation, and image-text matching. Standard contrastive loss can be applied for image-text contrastive learning, image-grounded text generation can be modeled as a classification problem optimized by cross-entropy loss, and image-text matching can be modeled as a binary classification problem optimized by cross-entropy loss. The resultant architecture can then extract a set of image information from image embeddings and align the set of image information with embeddings of the report text embedding space. A second phase, as shown in FIG. 2C, can involve vision-language generative learning, whereby a multilayer perceptron connecting the Q-Former with the LLM, and the Q-Former are trained to generate the radiology reports (e.g., impressions section, other sections) based upon the image embeddings from the second representation of the second stage of training. Language modeling loss is used to guide the training, and the resultant Q-Former is able to produce LLM-aligned tokens based on the image and provide the most useful information to the LLM, while removing irrelevant visual information.

Training/re-training can be efficiently performed by fixing all components other than the adapter, and training the adapter; however, training can alternatively be performed by further training and refining other components (e.g., encoders, image encoders, language encoders) of other portions of the multimodal model.

Evaluation of the trained multimodal model(s) of the set of models 110 of the system 110 can be based upon area under the receiver operating characteristic curve (AUC) metrics of classification scores for classification tasks (e.g., zero-shot classification tasks, data-efficient classification tasks, etc.). Evaluation of the trained multimodal model(s) of the set of models 110 of the system 110 can be based upon precision metrics of ranked images (e.g., based upon cosine similarity or other similarity metrics) returned in response to prompts, in relation to semantic search tasks. Evaluation of the trained multimodal model(s) of the set of models 110 of the system 110 can be based upon accuracy metrics of text-generation tasks, in relation to visual question answering tasks, report quality assurance tasks, and/or other tasks.

In examples, exemplary AUC metric values for classification tasks performed using examples of described multimodal model architecture were at least 0.6, at least 0.7, at least 0.8, at least 0.89, at least 0.9, or greater for classifications related to various findings described. In examples, exemplary precision metric values for image retrieval tasks performed, involving semantic search, using examples of described multimodal model architecture were at least 0.6, at least 0.7, at least 0.8, at least 0.89, at least 0.9, or greater. In examples, exemplary accuracy metric values for text-generation tasks performed, using examples of described multimodal model architecture were at least 50%, at least 55%, at least 60%, at least 65%, at least 70%, or greater.

The computing system 120 can include one or more: CPUs, GPUs, custom FPGA/ASICS, processors, microprocessors, servers, cloud computing, storage; memory; and/or any other suitable components. The computing system can be local (e.g., as a local computing system 121), remote (e.g., as a remote computing system 122), distributed, or otherwise arranged relative to any other system or module.

The system can include and/or interface with a set of databases 130 (e.g., EHR, EMR, RIS, CIS, PACS, etc.). Additionally or alternatively, the system can include and/or interface with: a reporting platform 140; a Picture Archiving and Communication System (PACS) and/or alternative image viewing and image storage platform; a speech recognition platform; a radiology worklist; a Radiology Information System (RIS); an electronic medical record (EMR) database; an electronic health record (EHR) database; a Clinical Information System (CIS) platform; a Health Information System (HIS) platform; a Laboratory Information System (LIS) platform; vendor-neutral archive (VNA) components; ontologies (e.g., radiological or other clinical ontology database); and/or any other database, storage, server, and/or software tools. In a specific example, the system includes a reporting platform (including a speech recognition platform and a user interface), wherein the reporting platform receives inputs and/or user actions from a radiologist, and displays a generated radiology report (e.g., determined using one or more models). In variants, the reporting platform 140 can include an input interface 141 (e.g., microphone, text box, etc.), which can function to receive input from a user (e.g., unstructured input), a speech transcription platform 142, and/or any other suitable components. The input interface can be rendered at a display of a user device (e.g., as shown in FIG. 5), part of an audio input device (e.g., the user device, microphone associated with speech-to-text software, etc.), include any combination of devices, and/or include any other device(s). In examples, the user device can include: a computer (e.g. a radiologist workstation computer), a headset (e.g., a virtual reality (VR) headset, an augmented reality (AR) headset, etc.), a mobile device (e.g., smartphone), and/or any other suitable device. Components of a user device can include a display subsystem (e.g., monitor, screen, projected image, etc.), an input subsystem (e.g., keys, touchscreen, microphone, etc.), one or more sensors (e.g., inertial measurement units, accelerometers, gyroscope, cameras, etc.), a processing subsystem, and/or any other suitable subsystem. Optionally, the system can include and/or interface with a software development kit, wherein customers and/or third parties can build additional features (e.g., further tools, features, functionality, analytics, historical report search, etc.) on top of the system (e.g., the reporting platform). The system can include and/or interface with an optional reporting platform. The reporting platform can optionally include a virtual assistant 143 (e.g., chat bot, voice-based assistant, etc.), which can function to provide information to and/or receive information from a user. In variants, the virtual assistant can receive input from a user and determine an appropriate response. In examples, the virtual assistant can respond by: answering a user question, directing the user to information (e.g., contained within the report, linked to outside of the report, etc.), update an error within the generated report, and/or otherwise function. Additionally or alternatively, the virtual assistant 143 can determine a set of information to surface to and/or solicit from a user. In examples, the virtual assistant can surface information (e.g., via a notification) to a user, such as: an indication that an error has been corrected, a section of a report that requires further review, contact information of another medical professional (e.g., on the patient's care team, a specialist, a clinical trial coordinator, etc.) and/or any other entity (e.g., patient emergency contact information), and/or any other suitable information. In further examples, the virtual assistant can prompt a user to provide an input (e.g., as a response to information surfaced to the user), which can include a direct input to the report (e.g., fill out an incomplete section of a report), an input required for one or more models to run (e.g., to fill out an incomplete section of a report, to perform an error correction, etc.), a selection (e.g., a positive or a negative selection, a selection from a plurality of options, etc.) of one or more model outputs (e.g., a verification/rejection of an error correction performed by the system, a dropdown menu selection, etc.), and/or any other suitable input. Additionally or alternatively to a reporting platform, the system (e.g., the set of trained models) can integrate directly with one or more external systems (e.g., RIS, PACS, HER, etc.), wherein the system can output a radiology report with minimal or no input from a radiologist.

The system 100 can additionally include and/or interface with any other suitable components.

4. Method

Figure 2A:
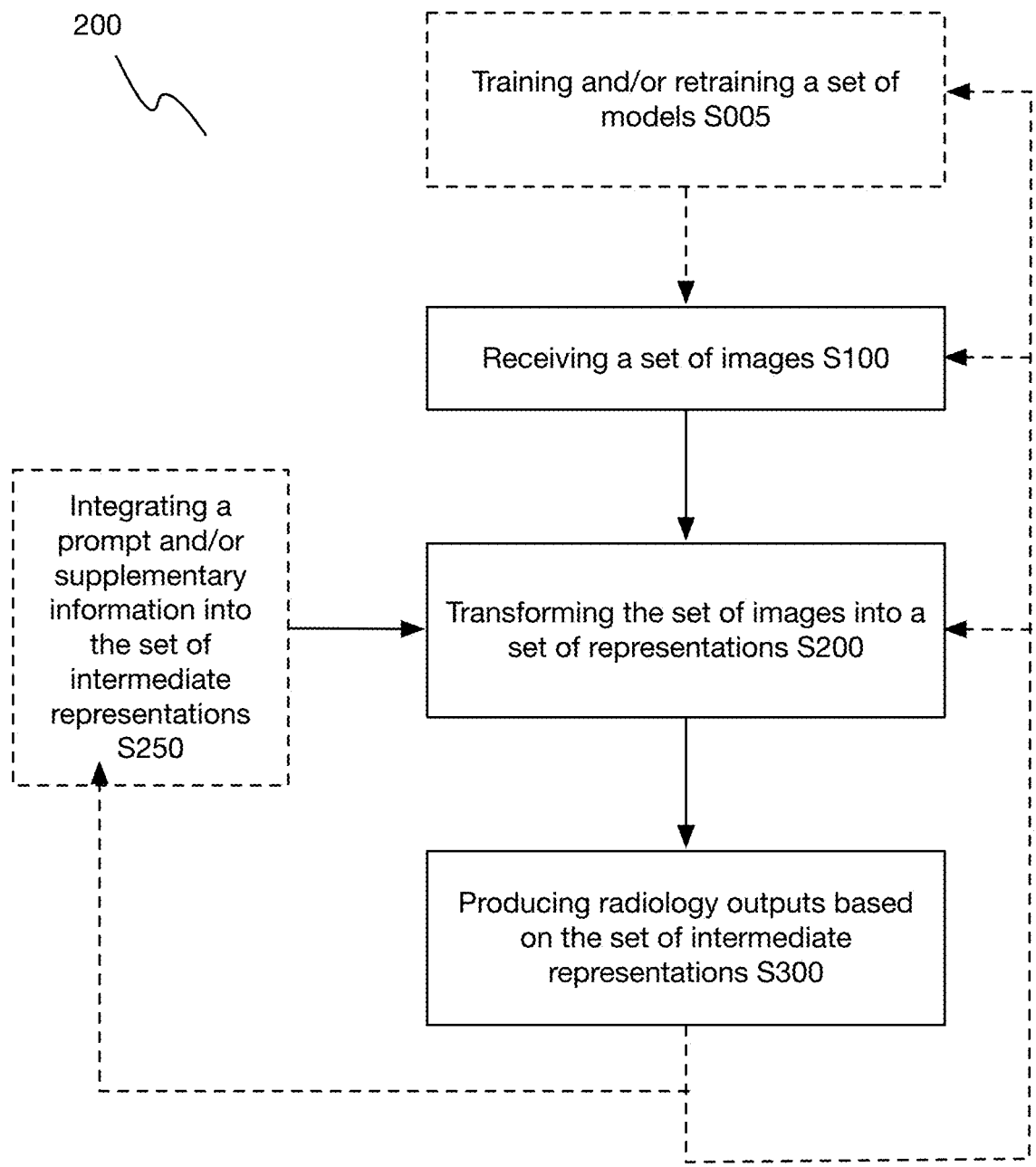
FIG. 2A depicts a flow chart of an embodiment of a method for the computer-aided processing of medical images.

As shown in FIG. 2A, a method 200 for computer-aided processing of medical images includes: receiving a set of images S100; transforming the set of images into a set of intermediate representations S200; and producing radiology outputs based on the set of intermediate representations S300. Additionally or alternatively, the method 200 can include integrating a prompt and/or supplementary information into the set of intermediate representations S250; training and/or retraining a set of models S005; and/or any other processes. Further additionally or alternatively, the method 200 can include or interface with any or all of the processes as described in any or all of: U.S. application Ser. No. 16/688,623, filed 19 Nov. 2019; U.S. application Ser. No. 17/020,593, filed 14 Sep. 2020; U.S. application Ser. No. 17/690,751, filed 9 Mar. 2022; U.S. application Ser. No. 18/215,354, filed 28 Jun. 2023; U.S. application Ser. No. 17/649,213, filed 28 Jan. 2022; U.S. application Ser. No. 18/374,535, filed 28 Sep. 2023; and U.S. application Ser. No. 18/374,526, filed 28 Sep. 2023, each of which is incorporated in its entirety by this reference, or any other suitable processes performed in any suitable order. The method 200 can be performed with a system 100 as described above and/or any other suitable system.

Figure 2B:
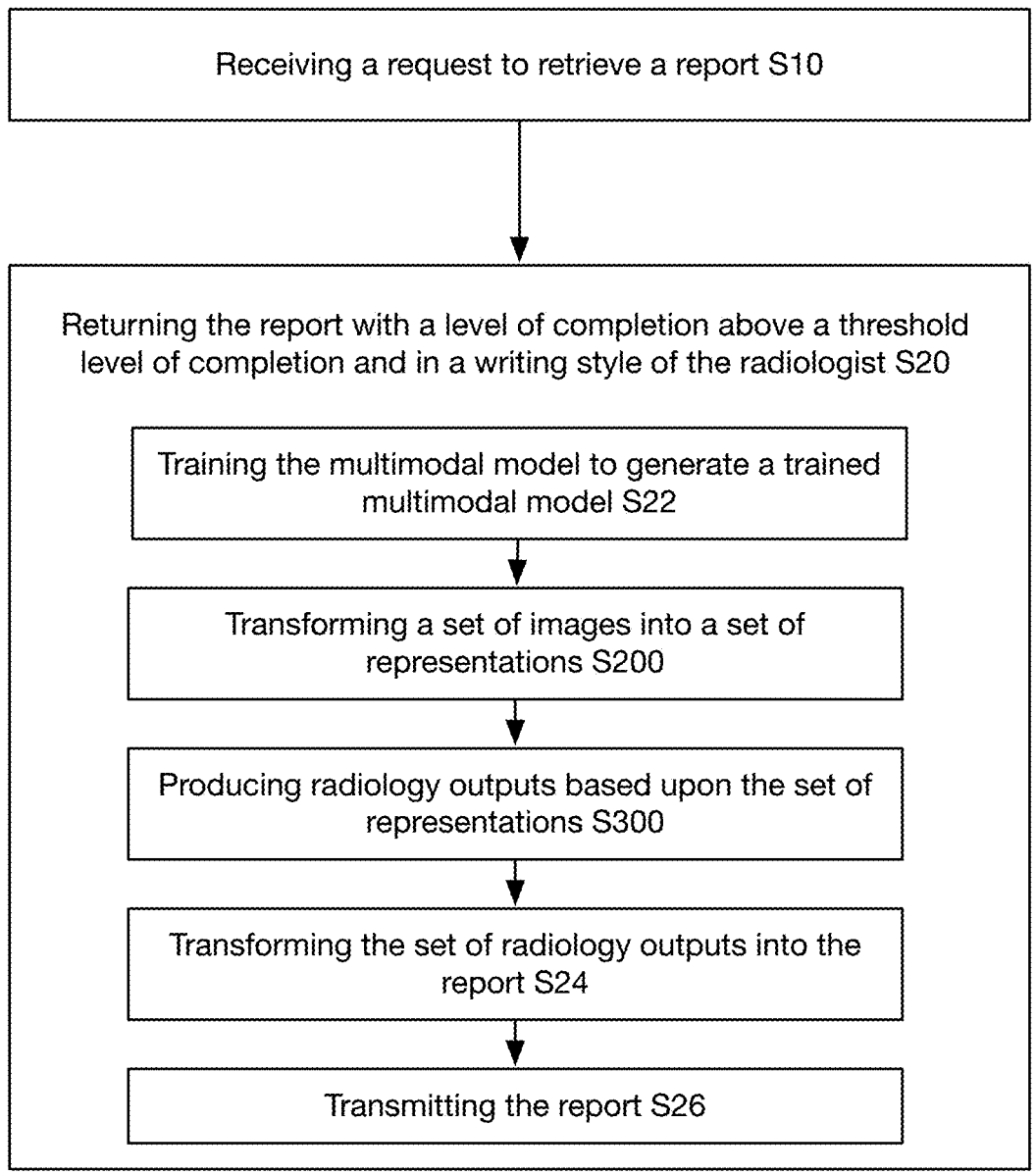
FIG. 2B depicts a flow chart of additional steps of a method for the computer-aided processing of medical images.
Figure 2C:
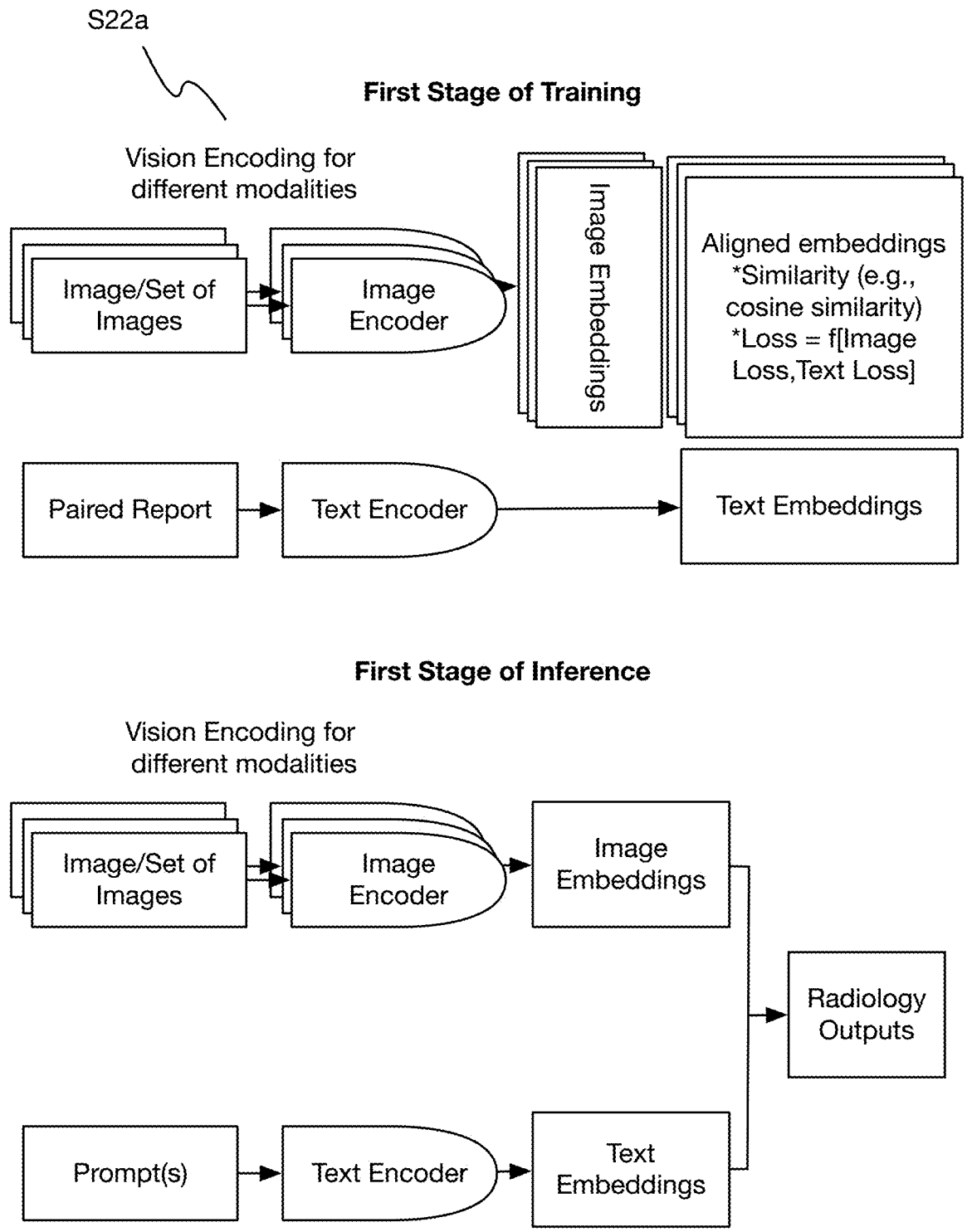
FIG. 2C depicts a flow chart of an embodiment of a first stage of multimodal model training, in relation to computer-aided processing of medical images.
Figure 2D:
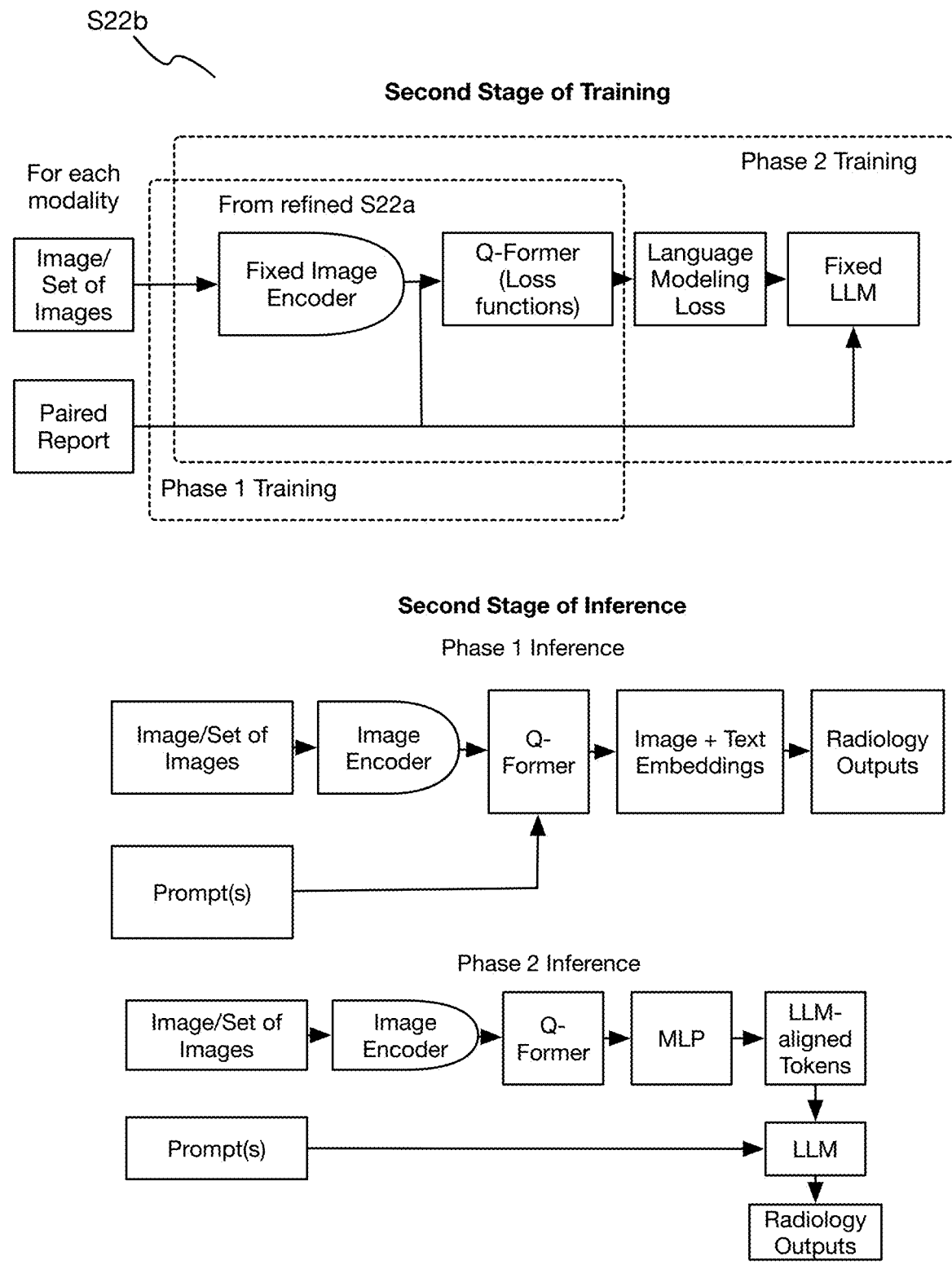
FIG. 2D depicts a flow chart of an embodiment of a second stage of multimodal model training, in relation to computer-aided processing of medical images.

A variation of the method 200, as shown in FIG. 2B, includes additional steps for receiving requests and transmitting completed (or nearly completed) reports to entities of interest. As shown in FIG. 2B, the method 200 can include: receiving a request (e.g., from a radiologist, from a clinician) to retrieve a report associated with a session with a patient S10; and returning the report with a level of completion above a threshold level of completion, wherein the report is returned in a writing style of the radiologist S20, wherein returning the report comprises: co-training the multimodal model, comprising an image model comprising a vision encoder component and a large language model (LLM) component, to generate a trained multimodal model S22; transforming a set of images generated during the session into a set of image representations (e.g., in relation to Step S200); returning a set of radiology outputs upon processing the set of image representations with the multimodal model (e.g., in relation to Step S300), wherein the multimodal model is structured to process image-based inputs and language-based inputs; transforming the set of radiology outputs into the report S24; and transmitting the report S26 (e.g., to the radiologist, to the clinician, to another entity).

The method 200 preferably functions to produce language used in a radiology report (e.g., set of findings, set of sections of the report, etc.), thereby automating part or all of the manual workload of a radiologist. This can in turn increase an efficiency of the radiologist, increase an accuracy of the report, and/or confer any other benefits. Additionally or alternatively, the method 200 can perform any other functions.

4.1 Method—Receiving Requests

Step S10 recites: receiving a request (e.g., from a radiologist, from a clinician) to retrieve a report associated with a session with a patient. Step S10 functions to provide an entity with a mechanism for retrieving information (e.g., findings, reports) for review and/or release, in a clinical setting. In variations, receiving the request in Step S10 is performed at an embodiment, variation, or example of the reporting platform 140 of the system 100 described in Section 3 above, which provides a user interface for receiving requests.

In variations, receiving the request in Step S10 can be performed using an input interface (e.g., input interface 141) of the reporting platform. In variations of Step S10, receiving the request can include receiving the request at an input interface (e.g., microphone, text box, etc.) that functions to receive an input from a user (e.g., unstructured command input), an input from a speech transcription platform, and/or any other suitable type of input. The input interface can be rendered at a display of a user device, part of an audio input device (e.g., the user device, microphone associated with speech-to-text software, etc.), include any combination of devices, and/or include any other device(s). In examples, the user device for submitting the request in relation to Step S10 can include: a computer (e.g. a radiologist workstation computer), a headset (e.g., a virtual reality (VR) headset, an augmented reality (AR) headset, etc.), a mobile device (e.g., smartphone), and/or any other suitable device. Components of a user device can include a display subsystem (e.g., monitor, screen, projected image, etc.), an input subsystem (e.g., keys, touchscreen, microphone, etc.), one or more sensors (e.g., inertial measurement units, accelerometers, gyroscope, cameras, etc.), a processing subsystem, and/or any other suitable subsystem. The request can, however, be provided and/or received in another suitable manner, where embodiments, variations, and examples are provided in Applications incorporated by reference.

4.2 Method—Returning Report(s)

Step S20 recites: returning the report with a level of completion above a threshold level of completion, wherein the report is returned in a writing style of the radiologist. Step S20 functions, along with Step S10, to provide a rapid mechanism for processing requests and returning reports (e.g., clinical reports, radiology reports, etc.) that satisfy threshold levels of completion, clinical accuracy, billing accuracy, and/or other criteria. Provided reports are also provided in a desired style (e.g., radiologist style, clinical group style, etc.) as described below. In examples, returned reports are provided in a manner that requires minimal or no manual intervention required (e.g., by a radiologist, by a clinician, by other caretaking personnel, etc.) given their high level of completion, quality, and accuracy. As such, Steps S10 and S20 can provide a low manual effort (e.g., "one-click") mechanism for automatically generating complete or near-complete reports, from input images, such as the set of images described. Steps S10 and S20 can involve returning the report within a duration of 10 minutes, within a duration of 8 minutes, within a duration of 6 minutes, within a duration of 5 minutes, within a duration of 4 minutes, within a duration of 3 minutes, within a duration of 2 minutes, within a duration of 1 minute, within a duration of 30 seconds, within a duration of 20 seconds, within a duration of 10 seconds, within a duration of 5 seconds, within a duration of 4 seconds, within a duration of 2 seconds within a duration of 1 second, or less.

Returning the report can be performed at the reporting platform (e.g., reporting platform 140 described in Section 3 above). In variations of Step S20, returning the report can including returning the report using a user interface of a component of the system 100 described above, such as a computer (e.g. a radiologist workstation computer), a headset (e.g., a virtual reality (VR) headset, an augmented reality (AR) headset, etc.), a mobile device (e.g., smartphone), and/or any other suitable device. Components of a user device can include a display subsystem (e.g., monitor, screen, projected image, etc.), an input subsystem (e.g., keys, touchscreen, microphone, etc.), one or more sensors (e.g., inertial measurement units, accelerometers, gyroscope, cameras, etc.), a processing subsystem, and/or any other suitable subsystem. The report can, however, be provided and/or received in another suitable manner, where embodiments, variations, and examples are described in Section 3 above.

In variations, the level of completion can be a level of completion (e.g., of findings, of an impressions section, of an entire radiology report, etc.) greater than a threshold level, where the threshold level can be: 50%, 55%, 60%, 65%, 70%, 75%, 80%, 85%, 90%, 95%, 98%, 99%, or greater (e.g., 100% completion).

In variations, the style can include stylistic elements (e.g., a word choice component, a grammar component, a consolidation and summary of findings component, a style of conclusions drawn from summarized findings component, preferred follow-up recommendations, etc.) used by a radiologist, by a radiologist group, by a clinical group, by a healthcare facility, or by another entity. The style can be used to determine any or all of: a length of one or more sections of the report (e.g., length of an impression section), a brevity of one or more section(s), a word flow, a type (e.g., formal versus informal, difficulty level, language, etc.) of words used in one or more sections of the report, a subset of words typically chosen by the radiologist or other entity (e.g., a set of words routinely chosen by the radiologist over their respective synonyms, a set of words having been chosen previously by the radiologist, etc.), an ordering and/or prioritization of a set of findings, a summarization of a set of multiple findings (e.g., order in which multiple findings are listed, which findings are grouped into more general findings, which findings are included in the impression and which are not, etc.), pertinent negative and/or global negative language (e.g., language that describes the lack of specific relevant positive findings and/or general positive findings), the conclusion(s) generated from a set of findings such as specific requirements for predicting a patient condition (e.g., radiologist only characterizes a spine curvature as scoliosis if it has an angle of 10 degrees or greater), differential diagnoses generated from a set of findings (e.g., indicating that any of these three patient conditions could result in this set of findings, and potentially discussing or explaining why one or more of these patient conditions is considered more or less likely), and/or any other suitable feature of the section(s) of the report. The radiologist style is preferably determined based at least in part on data from reports previously generated (e.g., manually generated) by the radiologist or other entity. Additionally or alternatively, the style can be determined based on other inputs (e.g., collected in surveys, questionnaires, etc.), predicted or synthetic data (e.g., synthetic radiology reports approved by the radiologist, etc.), radiologist metadata (e.g., demographic information, experience level, etc.), radiology group information, and/or any other suitable information.

The style is preferably in the form of a mapping (e.g., matrix, vector, auxiliary field of another matrix such as a set of word embeddings, etc.) including a set of weights to be used in subsequent process(es) of the method to generate an impression and/or any other suitable section(s) of a report, but can additionally or alternatively include any other data in any suitable data format. The style can be determined through deep learning, such as through any or all of: a set of trained models, a set of algorithms (e.g., machine learning algorithms), a set of neural networks, and/or any other suitable deep learning infrastructure. Additionally or alternatively, the style can be determined manually and/or through any other suitable process(es). Stylistic aspects can be received as inputs (e.g., in relation to free-form reports) to multimodal models described, where stylistic elements can be processed and used to refine the models in relation to generated outputs, during training and use. Additional aspects of style incorporation are described in U.S. application Ser. No. 17/020,593, now issued as U.S. Pat. No. 11,342,055, issued on 24 May 2022, which is herein incorporated in its entirety by this reference.

In relation to returning the report in Step S20, returning the report can be performed in a manner that significantly reduces workload for report generation. In examples, returning the report in Step S20 can be performed with: dictation of 20% fewer words by clinicians/radiologists (e.g., in order to generate a report from a clinical session), dictation of 22% fewer words by clinicians/radiologists (e.g., in order to generate a report from a clinical session), dictation of 24% fewer words by clinicians/radiologists (e.g., in order to generate a report from a clinical session), dictation of 26% fewer words by clinicians/radiologists (e.g., in order to generate a report from a clinical session), dictation of 28% fewer words by clinicians/radiologists (e.g., in order to generate a report from a clinical session), dictation of 30% fewer words by clinicians/radiologists (e.g., in order to generate a report from a clinical session), dictation of 32% fewer words by clinicians/radiologists (e.g., in order to generate a report from a clinical session), dictation of 34% fewer words by clinicians/radiologists (e.g., in order to generate a report from a clinical session), dictation of 36% fewer words by clinicians/radiologists (e.g., in order to generate a report from a clinical session), dictation of 38% fewer words by clinicians/radiologists (e.g., in order to generate a report from a clinical session), dictation of 40% fewer words by clinicians/radiologists (e.g., in order to generate a report from a clinical session), dictation of 42% fewer words by clinicians/radiologists (e.g., in order to generate a report from a clinical session), dictation of 44% fewer words by clinicians/radiologists (e.g., in order to generate a report from a clinical session), dictation of 46% fewer words by clinicians/radiologists (e.g., in order to generate a report from a clinical session), dictation of 48% fewer words by clinicians/radiologists (e.g., in order to generate a report from a clinical session), dictation of 50% fewer words by clinicians/radiologists (e.g., in order to generate a report from a clinical session), or a lower percentage of words dictated by clinicians/radiologists (e.g., in order to generate a report from a clinical session).

In examples, returning the report in Step S20, with the levels of completion described, can result in improved processing speed performance, with: 30 minutes saved (e.g., per clinical shift, per caretaking shift, per radiologist shift), thus providing ~6% improved speed in relation to standard systems; 35 minutes saved (e.g., per clinical shift, per caretaking shift, per radiologist shift), thus providing ~7% improved speed in relation to standard systems; 40 minutes saved (e.g., per clinical shift, per caretaking shift, per radiologist shift), thus providing ~8% improved speed in relation to standard systems; 45 minutes saved (e.g., per clinical shift, per caretaking shift, per radiologist shift), thus providing ~9% improved speed in relation to standard systems; 50 minutes saved (e.g., per clinical shift, per caretaking shift, per radiologist shift), thus providing ~10% improved speed in relation to standard systems; 55 minutes saved (e.g., per clinical shift, per caretaking shift, per radiologist shift), thus providing ~11% improved speed in relation to standard systems; 60 minutes saved (e.g., per clinical shift, per caretaking shift, per radiologist shift), thus providing ~12% improved speed in relation to standard systems; 65 minutes saved (e.g., per clinical shift, per caretaking shift, per radiologist shift), thus providing ~13% improved speed in relation to standard systems; 70 minutes saved (e.g., per clinical shift, per caretaking shift, per radiologist shift), thus providing ~14% improved speed in relation to standard systems; 75 minutes saved (e.g., per clinical shift, per caretaking shift, per radiologist shift), thus providing ~15% improved speed in relation to standard systems; 80 minutes saved (e.g., per clinical shift, per caretaking shift, per radiologist shift), thus providing ~16% improved speed in relation to standard systems; or greater speed performance.

Additional method steps (e.g., sub steps) related to Step S20 are provided below. Briefly, additional method steps include: co-training the multimodal model, comprising an image model comprising a vision encoder component and a large language model (LLM) component, to generate a trained multimodal model S22; transforming a set of images generated during the session into a set of image representations (e.g., in relation to Step S200); returning a set of radiology outputs upon processing the set of image representations with the multimodal model (e.g., in relation to Step S300), wherein the multimodal model is structured to process image-based inputs and language-based inputs; transforming the set of radiology outputs into the report S24; and transmitting the report S26 (e.g., to the radiologist, to the clinician, to another entity).

4.2.1 Method—Co-Training the Multimodal Model

Step S22 recites: co-training the multimodal model, comprising an image model comprising a vision encoder component and a large language model (LLM) component, to generate a trained multimodal model S22. Step S22 functions to improve the functioning of computer systems used for report generation and transmission, by involving multimodal model architecture that is efficiently trained and re-trained. With model architecture designed for efficient training and input processing, Step S22 thus provides tools for receiving inputs (e.g., image dataset inputs) and rapidly generating high-quality reports, to proactively reduce clinician/radiologist efforts in generating and reviewing reports prior to release or use. Returned outputs from the trained multimodal model can also be used to execute specific actions in response to specific anomalies detected in findings/reports generated according to Step S20.

In variations and examples, the multimodal model of Step S22 can include a large language model (LLM) and one or more vision encoders structured as a language-aligned image encoder integrated, by way of an adapter, onto a fixed LLM. The multimodal model of Step S22 is structured to receive a diverse set of inputs (e.g., dictation data, text data, images, audio, etc.).

Each vision encoder of the vision encoder component can be structured and trained to process input images from a corresponding imaging modality (e.g., x-ray image vision encoder, computed tomography image vision encoder, magnetic resonance imaging image vision encoder, nuclear image vision encoder, optical coherence tomography image vision encoder, other image vision encoder, etc.).

Co-training the multimodal model in Step S22 can be performed with diverse input types simultaneously, given that the multimodal model integrates advanced vision models with LLM architecture, which involve transformer-based artificial intelligence (AI) models that are trained and re-trained on large datasets and can generalize to a range of clinical tasks (e.g., zero-shot image-to-text generation upon receipt of natural language instruction inputs). Training of such models addresses limitations of vision-only models and are trained on multimodal data (e.g., clinical images with paired free-text reports that meet various accuracy and billing standards). Multimodal model structures described in relation to Step S22 are capable of generating solutions associated with the long-tails of diagnoses in the clinical domain and/or outside of the clinical domain. In particular, long-tails of diagnoses describe situations where a small number of conditions are routinely observed, but the majority are rare.

In the specific example, the LLM of Step S22 can include a version of the Pathways Language Model (e.g., PaLM, PaLM2, etc.). Variations of the LLM of Step S22 can include a version of a Language Model for Dialogue Applications (LaMDA), a Gemini model (e.g., a decoder-only transformer), a GPT model, a Llama model, a GLM model, a Claude model, a Reka Flash model, a Qwen model, a Grok model, a Molmo model, a Jamba model, a DeepSeek Coder model, an Athene model, a Phi-3 model, a Command-R-Plus model, an InternLM model, a Yi-Large model, a Mixtral of Experts model, a Gemma model, a Nemotron model, and/or another suitable model.

The multimodal model of Step S22 can have a context length of: up to 3,000,000 tokens, up to 2,000,000 tokens, up to 1,000,000 tokens, up to 500,000 tokens, up to 100,000 tokens, up to 90,000 tokens, up to 80,000 tokens, up to 70,000 tokens, up to 60,000 tokens, up to 50,000 tokens, up to 40,000 tokens, up to 35,000 tokens, up to 33,000 tokens, up to 30,000 tokens, up to 25,000 tokens, or another suitable number of tokens. Each context window can contain multiple forms of input, and different modes can be interleaved without requirement to be presented in a fixed order, allowing for a multimodal conversation. Input images can be of different resolutions. The multimodal model can have sparse mixture-of-experts architecture.

In specific examples of Step S22, the multimodal model can be trained and re-trained (e.g., with generated outputs) using image data (e.g., from various types of images described) paired with corresponding free-text clinical reports (e.g., radiology reports), where the clinical reports include reports generated by clinicians (e.g., radiologists) and/or modified by clinicians post-automatic generation of a candidate report. Classification evaluation was performed on image and report datasets. In the specific example, classification performance was extremely high-performing (e.g., area under curve (AUC) values of greater than 0.8). The exemplary multimodal model required orders of magnitude (e.g., 2 orders of magnitude, 3 orders of magnitude) less data to achieve similar performance to supervised contrastive learning models.

In variations of Step S22, the multimodal model also efficiently trained and re-trained, in comparison to training/tuning of an LLM, by way of the fixed LLM and vision encoder architecture of the multimodal model. Training can be performed using image datasets paired with free-text clinical reports (e.g., radiology reports), leveraging routinely collected data (and not requiring manual labelling of data). Re-training can be performed using image datasets paired with automatically generated free-text clinical reports (e.g., radiology reports) that have been modified by a clinical entity (e.g., radiologist) prior to release.

In a specific example of Step S22, the multimodal model can be trained in stages. In a first stage of training S22a (depicted in FIG. 2C), the multimodal model is trained using contrastive learning with language-image pre-training, a neural network approach. In the first stage of training, a training dataset including image datasets paired with free-text clinical reports is processed, where by image datasets are passed as inputs to an image encoder to generate a set of image embeddings, in parallel with passing the paired free-text clinical reports as inputs to a language encoder to generate a set of text embeddings. Image data can be augmented (e.g., resized, flipped, rotated, etc.) in relation to generation of image embeddings. A dataset classifier is then created from label text, and used for zero-shot prediction of test image data. Training can involve a learning rate (e.g., Stochastic gradient descent (SGD) constant learning rate was set to 0.0001, set to another value), a momentum (e.g., a momentum of 0.98, a momentum of 0.99), a number of training steps (e.g., 70,000 steps, 80,000 steps, 90,000 steps, etc.), and/or other training metrics. The first stage of training utilizes a contrastive loss function, which drives image datasets and associated generated clinical reports (e.g., radiology reports) closer in a high-dimensional space, and drives apart mismatched image datasets and text. The first stage of training thus utilizes radiology reports to align pre-trained supervised contrastive learning-based, vision-only model with a language encoder. Variations of training according to a first phase can additionally or alternatively involve use of a UNITER convolutional neural network model architecture, masked language model architecture, image text matching architecture, or other suitable architecture.

In a second stage of training S22b (depicted in FIG. 2D), the multimodal model is trained using bootstrapping language-image pre-training architecture, where a second representation of the multimodal model of the second stage of training is built directly upon a first representation of the multimodal model of the first stage of training. The second stage of training is configured to extract location-aware features from the unpooled spatial image embedding space of the first stage of training, and then to map them onto the language token space of the fixed LLM. The second representation of the multimodal model of the second stage of training functions as an adapter between the image encoder and the fixed LLM, and passes information between the image encoder(s) and the language encoder(s) of the multimodal model architecture by way of an attention mechanism. The second stage of training S22b can include multiple phases. A first phase, as shown in FIG. 2C, can involve vision-language representation learning whereby the vision-language model (e.g., Q-former) is training to understand images and reports in a shared embedding space by executing image-text contrastive learning, image-grounded text generation, and image-text matching. Standard contrastive loss can be applied for image-text contrastive learning, image-grounded text generation can be modeled as a classification problem optimized by cross-entropy loss, and image-text matching can be modeled as a binary classification problem optimized by cross-entropy loss. The resultant architecture can then extract a set of image information from image embeddings and align the set of image information with embeddings of the report text embedding space. A second phase, as shown in FIG. 2C, can involve vision-language generative learning, whereby a multilayer perceptron connecting the Q-Former with the LLM, and the Q-Former are trained to generate the radiology reports (e.g., impressions section, other sections) based upon the image embeddings from the second representation of the second stage of training. Language modeling loss is used to guide the training, and the resultant Q-Former is able to produce LLM-aligned tokens based on the image and provide the most useful information to the LLM, while removing irrelevant visual information.

Training in Step S22 can be efficiently performed by fixing all components other than the adapter, and training the adapter; however, training can alternatively be performed by further training and refining other components (e.g., encoders, image encoders, language encoders) of other portions of the multimodal model.

Evaluation of the trained multimodal model(s) in S22 can be based upon area under the receiver operating characteristic curve (AUC) metrics of classification scores for classification tasks (e.g., zero-shot classification tasks, data-efficient classification tasks, etc.). Evaluation of the trained multimodal model(s) of the set of models 110 of the system 110 can be based upon precision metrics of ranked images (e.g., based upon cosine similarity or other similarity metrics) returned in response to prompts, in relation to semantic search tasks. Evaluation of the trained multimodal model(s) of step S22 can be based upon accuracy metrics of text-generation tasks, in relation to visual question answering tasks, report quality assurance tasks, and/or other tasks.

In examples, exemplary AUC metric values for classification tasks performed using examples of described multimodal model architecture were at least 0.6, at least 0.7, at least 0.8, at least 0.89, at least 0.9, or greater for classifications related to various findings described. In examples, exemplary precision metric values for image retrieval tasks performed, involving semantic search, using examples of described multimodal model architecture were at least 0.6, at least 0.7, at least 0.8, at least 0.89, at least 0.9, or greater. In examples, exemplary accuracy metric values for text-generation tasks performed, using examples of described multimodal model architecture were at least 50%, at least 55%, at least 60%, at least 65%, at least 70%, or greater.

As such, as shown in FIG. 2A, the method 200 can optionally include training and/or updating of any or all of the set of models S005, such as described above. This can be performed prior to S100, after S300, iteratively, at set intervals, and/or at any other times.

4.2.2 Method—Receiving Images and Transforming Images

The method 200 can include receiving a set of images S100, which functions to receive information with which to ultimately produce relevant and accurate radiology outputs, and which are transformed (e.g., into representations, into embeddings with a vision encoder of the multimodal model, etc.) according to Step S200 described below. S100 is preferably performed at least initially during the method 200, but can additionally or alternatively be performed iteratively and/or at any other times during the method 200 (e.g., in relation to a session with a patient).

The set of images preferably includes one or more images from a scan of a body region of the patient. In preferred variants, the set of images includes one or more X-ray images, but can additionally or alternatively include CT images and/or MRI images (e.g., a portion of a CT or MRI scan, all images in the scan, a grouping of images, etc.), ultrasound images, PET scan images, fluoroscopy images, nuclear imaging images, optical coherence tomography images, and/or other images. The set of images can additionally or alternatively be generated from video frames, voxels, and/or other captured content.

The set of images can additionally include historical images and/or other patient information.

The set of images are preferably received at a computer or processor (e.g., computing system 200 described in Section 3 above), where the computer or processor is configured to evaluate the multimodal model architecture described. The set of images of Step S100 can additionally or alternatively be received at any combination of computers, processors, servers, or other components.

As shown in FIGS. 2A and 2B, the method 200 can include transforming the set of images into a set of intermediate representations S200, which functions to distill the image information into an accurate and comprehensive representation that can be effectively interpreted by the multimodal model(s) described in relation to step S22. Additionally, S200 preferably functions to integrate a prompt and/or other supplementary information into one or more of these intermediate representations, which guides the multimodal model to produce a relevant, optimal language output. S200 can additionally or alternatively perform any other functions, such as, but not limited to, enabling comparative analyses to be done between images taken at multiple dates, and/or any other outcomes to be produced.

S200 is preferably performed in response to S100, but can additionally or alternatively be performed at any other suitable time(s), multiple times, iteratively, and/or at any other time(s). For instance, Step S200 can be performed upon receipt of the request in Step S10.

S200 is preferably performed with an embodiment, variation, or example of the multimodal model (e.g., as described above), but can additionally or alternatively be performed with any other model(s).

In one variant, S200 includes generating image embeddings from the set of images, wherein generating image embeddings comprises: augmenting input images (e.g., resizing to a size criterion, resizing to a resolution criterion, flipping, rotating, etc.), and/or processing input images with image encoder/vision encoder subarchitecture of the multimodal model to generate a set of image embeddings. In a specific example, the image encoder/vision encoder can be structured as a SupCon image encoder. In another specific example, the image encoder/vision encoder can be structured as a ResNet encoder. In another specific example, the image encoder/vision encoder can be structured as a SimCLR encoder. In relation to Step S200, the resultant image embeddings are aligned with outputs of paired text embeddings retrieved from outputs obtained during training of the multimodal model (where aligned image embeddings and text embeddings were previously evaluated based upon similarity metrics, such as cosine similarity metrics). Image data (e.g., test data, training data) can additionally or alternatively be transformed and/or configured, as described in relation to additional variants below.

In another set of variants, S200 includes using a $1^{st}$ trained transformer model to take pixel information (e.g., tensor of pixel values) from the set of images to produce a high-dimensional representation (e.g., tensor of embeddings) that is used as an input to a $2^{nd}$ transformer (e.g., as described below).

The $1^{st}$ transformer (e.g., image encoder) is preferably trained alone and based on image data, but can additionally or alternatively be trained on any other information (e.g., radiology reports) and/or with any other models.

In a demonstrative example, the $1^{st}$ trained transformer is configured to encode the image pixel information within the context of what it learned during its training process (e.g., trained on extensive datasets of images, trained on images without a specific task prescribed, etc.), effectively enabling the $1^{st}$ transformer to understand what different types of images represent and how to differentiate them (e.g., how to determine that a certain chest images includes a lung nodule but a different chest image does not) and encode this understanding into an embedding. In a particular specific example, for instance, the embedding can encode information (e.g., in a non-discernible way to a human) that a nodule is present in right upper lobe, what the specific features are of that image are relative to other images, and/or any other information. The embedding can optionally, for instance, be used (e.g., in the method 200, in other workflows, etc.) to enable comparisons to be made between images, wherein a distance between embeddings corresponds to a difference between the images (e.g., images with a minimal distance are the most similar).

In variants with multiple images, the $1^{st}$ transformer can process the images together, separately, or in any other manner. In an example, for multiple images, either the $1^{st}$ transformer or the $2^{nd}$ transformer would preferably function to collapse the multiple images into some unified representation (e.g., with some situational awareness among the images). Alternatively, the language model can receive multiple representations.

S200 further preferably includes processing the initial representation with a $2^{nd}$ transformer to produce a $2^{nd}$ intermediate representation, where the $2^{nd}$ intermediate representation is able to be processed by the language model.

As part of producing the $2^{nd}$ intermediate representation, the method 200 preferably further includes integrating a prompt and/or supplementary information into the set of intermediate representations S250, which functions to guide the language model to produce an output that corresponds to the objective of the prompt (e.g., producing a set of findings, producing a set of pertinent positive findings, producing a whole radiology report, producing a specified section of a radiology report, etc.).

S250 is preferably as part of the $2^{nd}$ transformer evaluation process, where the prompt and/or other supplementary information are used as an input (e.g., with the $1^{st}$ intermediate representation) to the $2^{nd}$ transformer. Additionally or alternatively, the prompt can be used in producing the $1^{st}$ intermediate representation and/or used at any other parts of the method 200.

The prompt (e.g., text prompt) preferably includes an indication and/or instructions corresponding to the objective of the workflow, or in other words, what type of radiology output is desired to be produced by the language model (e.g., write a summary of this image, produce a set of findings associated with the image, write the findings section of a radiology report, produce a preliminary radiology report, etc.). The prompt can be static, dynamic (e.g., wherein a radiologist or other user can ask questions such as "does the image contain a nodule?," "what size is the nodule?," etc.), or any combination.

Figure 4:
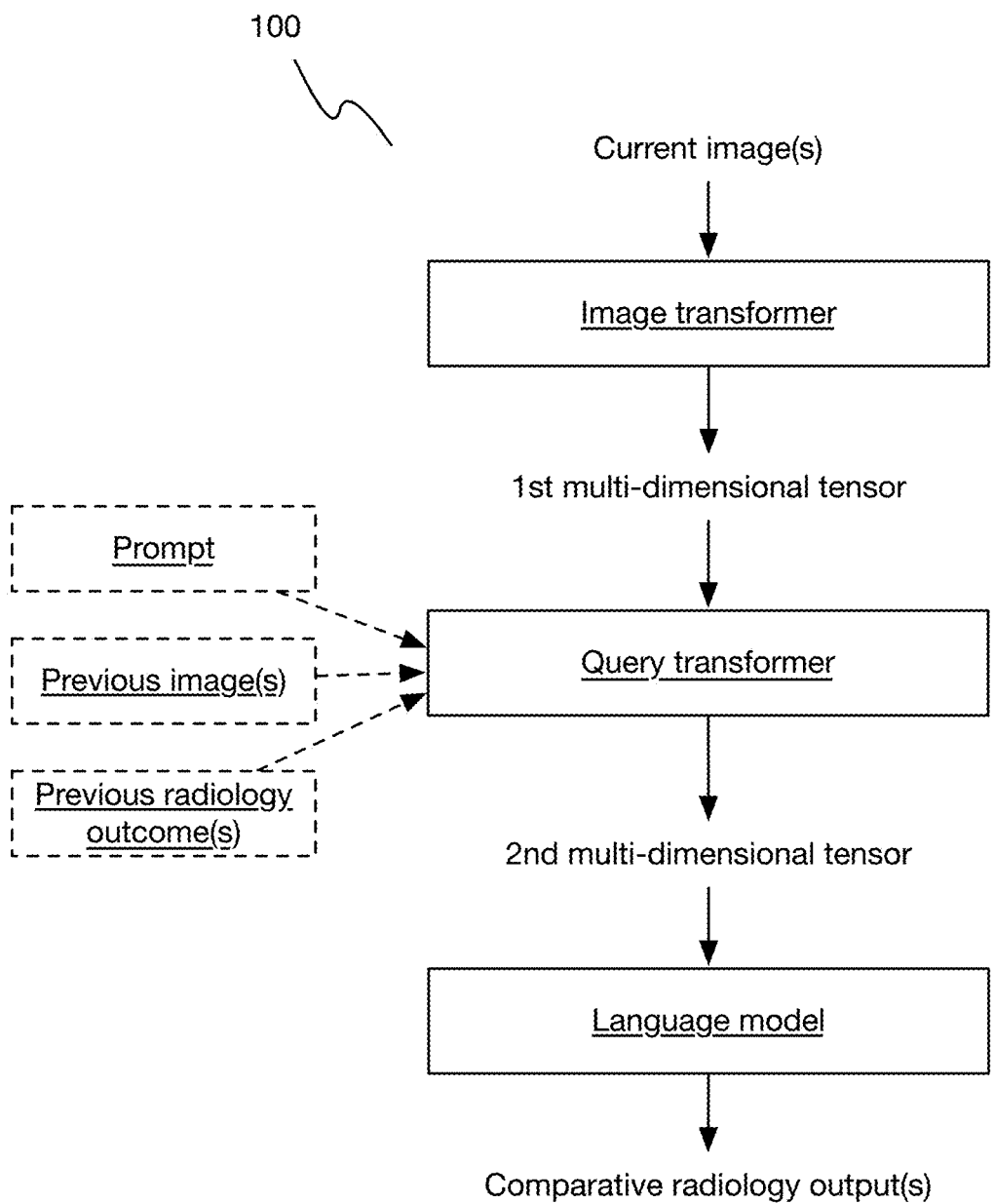
FIG. 4 depicts an example of a system for the computer-aided processing of medical images for use in performing a comparative analysis.

Additionally or alternatively, the prompt can be associated with performing a comparative analysis between different studies, such as between images taken previously of a body region of a patient and current images of that body region. In a first variant of a comparative analysis (e.g., as shown in FIG. 4), the prior image(s) and prior radiology output(s) (e.g., prior findings produced during a previous iteration of the method 200, the previous report and/or relevant sections from the previous report, etc.) would be used as inputs for the $2^{nd}$ transformer, with a new prompt (e.g., "perform a comparative analysis"), where the new radiology output can include comparisons between the findings or any other comparative information. In a $2^{nd}$ variant, the method 200 can be performed twice, once for each set of images, and then the radiology outputs can be compared (e.g., in an additional process, with an additional model, etc.).

Any other supplementary information can be received in S250 such as, but not limited to, patient information (e.g., patient metadata), historical information, scan information, and/or any other information.

The $2^{nd}$ transformer (e.g., Q-former, transformer trained with Q-learning, etc.) is preferably trained on the method pipeline (e.g., not trained on human interpretable inputs and outputs) and further preferably trained together with the language model, which functions to optimize the $2^{nd}$ transformer's ability to both learn to identify features within the initial representation and to act as a translation layer between the image model(s) and the language model(s). Additionally or alternatively, the $2^{nd}$ transformer can be otherwise suitably trained.

The $2^{nd}$ transformer preferably produces multi-dimensional tensor as its output ($2^{nd}$ intermediate representation), but can additionally or alternatively produce any other output(s).

Additionally, S200 can include any other suitable processes.

4.2.3 Method—Producing Radiology Outputs Based on the Set of Intermediate Representations As shown in FIGS. 2A and 2B, the method 200 can include producing radiology outputs based on the set of intermediate representations S300, which functions to process the transformed intermediate representations (e.g., set of embeddings) with the multimodal model to produce a set of radiology outputs that can be used in producing a radiology report, according to Step S24.

S300 is can be performed in response to S200 but can alternatively be performed at any other times. S300 is preferably performed with an embodiment, variation, or example of the multimodal model (e.g., vision encoder grafted onto an LLM by way of an adapter) (e.g., as described above), where the multimodal model produces text based on image representations generated from the set of images, as described above. Additionally or alternatively, S300 can be performed with any other models.

The radiology outputs (e.g., as described above) can include findings, one or more sections (e.g., findings section, impression section, etc.) of a radiology report, a radiology report (e.g., preliminary report, final report, etc.), answers to one or more questions asked by a user or machine, and/or any other outputs.

Exemplary findings can include findings related to airspace opacity findings, fracture findings, pneumothorax findings, consolidation findings, pleural effusion findings, pulmonary edema findings, atelectasis findings, cardiomegaly findings, support device-associated findings, enlarged organ findings, lesion findings, and other findings.

In some variants, any or all of the radiology outputs can be customized to the language and/or writing style (e.g., average length, specific word choice, etc.) of the radiologist providing the report, as described above. This can involve, for instance, using and/or interfacing with any or all of the processes as described in U.S. application Ser. No. 17/020, 593, filed 14 Sep. 2020, which is incorporated in its entirety by this reference.

Some variants of the method 200 can optionally include analyzing the output of the language model with additional models (e.g., additional language models) to determine or identify any or all of: where in the report the radiology output should be placed (aka insert it into the correct parts of the report); additional post-processing outcomes (e.g., to remove irrelevant parts based on a negative template associated with the report); additional sections of the report; formatting of the report; and/or any other outputs.

In some examples, a set of findings produced in S300 can be further analyzed by one or more processes as described in U.S. application Ser. No. 17/020,593, filed 14 Sep. 2020, which is incorporated in its entirety by this reference, to generate an impression section of the report (e.g., that is custom to the radiologist's writing style). Additionally or alternatively, the multimodal model can be configured to mimic the radiologist's writing style in the radiology outputs themselves.

In a particular specific example, the multimodal model is the same for all users (e.g., radiologists). In a second particular specific example, each user has their own multimodal model (e.g., to reflect different writing styles, specialties, etc.). In a third particular specific example, any or all of the prompt, supplementary information, and/or intermediate representations can include and/or be altered to reflect features associated with different users (e.g., different writing styles). In a fourth particular specific example, a universal language model can include radiologist-specific layers, wherein the appropriate layers are triggered based on which radiologist is performing the report.

Additionally or alternatively, S300 can include any other suitable processes.

4.2.4 Method—Generating and Transmitting Reports

Step S24 recites: transforming the set of radiology outputs into the report. S24 functions to produce a report (e.g., radiology report) from outputs generated in Step S300, where the report satisfies quality metrics described above, in order to reduce or eliminate clinician/radiologist workload in relation to report generation. The radiology outputs (e.g., as described above) can include findings, one or more sections (e.g., findings section, impression section, etc.) of a radiology report, answers to one or more questions asked by a user or machine, and/or any other outputs.

Step S24 can include retrieving a template of a radiology report and/or set of candidate templates, wherein the template and/or set of candidate templates of the radiology report can be populated with the set of radiology outputs, in a desired style.

Step S24 can include applying an input determination model to select items of the set of radiology outputs and populate the template(s) with the selected items, wherein the selected items can include one or more of: mathematical calculation fields (e.g., formulas, equations, charts, tables, graphs, etc.), images, links (e.g., to key image(s) on PACS and/or another image platform, to a medical database, to a piece of data within a patient's historical records, etc.), and/or functionality (e.g., relevant to: a finding and/or associated information, the current study, the patient, any other input, etc. In examples, importing multimedia items to create a multimedia report (e.g., including text and at least one of: mathematical calculation fields, images, links, and/or any other multimedia item) can adhere to a published standard (e.g., IHE standard, IMR standard, etc.). In a specific example, the calculation fields can be manually populated and/or automatically populated (e.g., based on measurements determined based on radiology images) to calculate a finding characteristic (e.g., volume); an example is shown in FIG. 8. In a specific example, the input determination model can retrieve a relevant mathematical formula (e.g., ellipsoid volume formula) based on an input (e.g., a finding of a tumor) received. Optionally, the formula can be presented at the user interface with an input component (e.g., text boxes spaces within the formula for missing data fields such, empty variables below the formula, the input interface, etc.), wherein the radiologist can provide further structured and/or unstructured input (e.g., defining a variable within the formula). The output of the formula (e.g., tumor size) can be automatically calculated based on the further input. A mathematical calculation field can optionally include a visual representation of data, such as a chart (e.g., line chart, bar chart, scatter plot, survival curve, flow chart, box plot, funnel plot, forest plot, Sankey diagram, etc.), table (e.g., patient data table, clinical trial results table, treatment comparison table, adverse events table, laboratory values table, drug dosage table, patient demographics table, surgical outcomes table, etc.), and/or any other visual data structure. In examples, inserting multimedia items and/or findings into a report can be performed: automatically (e.g., received directly from PACS), in response to a user input (e.g., click, hotkey, button, etc.). The input determination model associated with Step S24 can also determine a template and/or macro. Optionally, the template and/or macros may contain a set of dependent fields and/or nested fields. In examples, templates and macros may contain one or multiple display means for users to complete the dependent field (e.g., pick lists, dropdown menus, text box, etc.). Optionally, templates, macros, pick lists (or any similar means of presenting a predefined list of selections such as a dropdown menu, etc.), and/or any other suitable components can be nested within other templates, macros, pick lists, and/or any other suitable components. Optionally, the system can include multiple levels of nesting.

The templates can be retrieved from a database which can optionally include templates created and saved by the radiologist or other clinical entity, generated (e.g., based on a historical set of radiology report created by the radiologist), and/or otherwise determined. In examples, the input determination model can determine a template and/or macro based on any of the inputs received. Preferably, determining a template (e.g., with the input determination model) is performed based on criteria or factors including one or more of: study information, radiology report information, order information, patient information, radiologist information, radiology group information, healthcare facility information, the presence or absence of prior studies, the findings, the patient identifier, the treatment, and/or other inputs.

The input determination model can output one or more selected or ranked templates and/or instructions (e.g., rules, mappings, macros, etc.) based on the set of inputs received. For the sake of simplicity, the instructions will be equivalently referred to herein as "macros," but can take any other suitable form. In variants, S24 can optionally include determining a single template, or determining a set of templates, wherein the radiologist can optionally select a template and/or macro from a presented set (e.g., a ranked list; in a drop-down sort list; unsorted; etc.) of the selected or ranked templates and/or macros. The templates and/or macros can optionally be selected/ranked to be relevant to: the current study, the radiologist, the radiology group, the healthcare facility, the patient, a parameter specified by the radiologist (e.g., in a drop-down menu), and/or any other input. In an example, templates and/or macros (e.g., a subset of templates and/or macros) can be selected from a database of templates and/or macros (e.g., a database specific to the radiologist, radiology group, and/or healthcare facility). Optionally, macros can additionally or alternatively be determined based on the selected template (e.g., wherein a template is associated with/stored with a set of macros).

Additionally or alternatively, Step S24 can include transforming the set of radiology outputs into the report according to embodiments, variations, and examples of steps described in U.S. application Ser. No. 18/638,368 filed on 17 Apr. 2024, which is herein incorporated in its entirety by this reference.

Step S26 recites: transmitting the report (e.g., to the radiologist, to the clinician, to another entity), which functions to transmit generated reports to an appropriate entity (e.g., the requester) in a manner that requires minimal or no manual intervention required (e.g., by a radiologist, by a clinician, by other caretaking personnel, etc.) given their high level of completion, quality, and accuracy. As such, Step S26 can provide a low manual effort (e.g., "one-click") mechanism for automatically generating complete or near-complete reports, from input images, such as the set of images described.

Transmitting the report can be performed at the reporting platform (e.g., reporting platform 140 described in Section 3 above, in relation to system 100). In variations of Step S26, transmitting the report can including transmitting the report for observation at a user interface of a component of the system 100 described above, such as a computer (e.g. a radiologist workstation computer), a headset (e.g., a virtual reality (VR) headset, an augmented reality (AR) headset, etc.), a mobile device (e.g., smartphone), and/or any other suitable device. Components of a user device can include a display subsystem (e.g., monitor, screen, projected image, etc.), an input subsystem (e.g., keys, touchscreen, microphone, etc.), one or more sensors (e.g., inertial measurement units, accelerometers, gyroscope, cameras, etc.), a processing subsystem, and/or any other suitable subsystem. The report can, however, be transmitted another suitable manner, where embodiments, variations, and examples are described in Section 3 above.

4.2.5 Method—Additional Practical Applications and Executed Actions

Additionally or alternatively, the methods described can include any other suitable processes.

For instance, generated findings and reports from Steps S300 and S26 can trigger subsequent method steps including one or more of: transmitting reports, findings, and/or other information as an input (e.g., to a report generation model, to another input determination model, etc.), displayed to a radiologist (e.g., as a reminder notification, as text that can be inserted, as analysis on what the radiologist should discuss in the report, etc.); embedding findings and/or reports directly within personal or system templates and/or macros (e.g., in a reporting platform); inserting findings and/or reports as part of a specific report type (e.g., with results of calculations automatically included in the correct location in the report); and/or other steps related to report generation, template modification, notifying relevant caretaking entities associated with involved patients.

Additionally or alternatively, generated findings and reports from Steps S300 and S26 can trigger subsequent method steps including: automatically triggering a downstream action; notifying and/or other establishing communications with an entity associated with the patient (e.g., to another provider, caretaker, emergency contact, establishment of a communication between two or more parties, etc.); generating and executing a referral (e.g., to a relevant specialist, to a relevant clinical trial, etc.) for the patient in response to a finding associated with a condition, where exemplary conditions are described below; providing follow-up care coordination (e.g., for one or more actionable findings) by identifying an appointment time that is suitable for the patient and a caretaker with expertise in treating the actionable finding(s); streamlining (e.g., automating) coding (e.g., for billing purposes) in relation to accurately billing suitable entities for provided care; deriving a critical results workflow; and/or performing any other suitable action.

In relation to deriving a critical results workflow as a result of finding and/or report generation, the method can include executing a critical results workflow, wherein a certain list of critical results (e.g., findings, macros, templates, etc.), which may vary by health system, radiology practice, and/or any other identifier, can automatically trigger actions (e.g., notifications within the EHR, notifications outside the EHR to an ordering and/or referring provider, etc.) for providing critical care. In particular, rapid report generation and automatic execution of a critical results workflow can provide patient care in an unprecedented manner, with respect to reduced wait times between a patient diagnostic session and treatment provision. In specific examples, the methods can initiate treatment within a duration of 4 days, within a duration of 3 days, within a duration of 2 days, within a duration of 1 day, with a duration of 8 hours, within a duration of 4 hours, or less. In a specific example, the addition of a specific critical result (e.g., the selection of a template, the determination of a finding, the selection of a macro, etc.) associated with a certain critical condition (e.g., a pulmonary nodule) may trigger (e.g., automatically) one or more downstream actions (e.g., communications with and/or referrals to a Pulmonary clinic and/or a thoracic surgeon), with respect to a detected anomaly.

As such, in relation to Step S300, returning the set of radiology outputs can include detecting an anomaly captured in the set of images and/or other aspect of a patient session. Variations of anomalies detected using the outputs of the multimodal models described can include global anomalies (e.g., corruptions, medical conditions, alterations, destructions) and/or local anomalies (e.g., corruptions, pathologies, local image anomalies). Variations of anomalies detected can further include image artifacts, such that the multimodal model is trained to differentiate between medically-relevant anomalies and imaging artifacts, whereby differentiation informs subsequent actions (e.g., re-image vs. medical treatment). Detection of anomalies can trigger subsequent actions, including executing imaging by another imaging modality for validation of a finding, initiating medical treatment, triggering review by a medical expert, through platform 140 described above, initiating referral to a specialist for the patient, and/or another suitable subsequent action.

Detected anomalies can be associated with one or more of: nervous system biological material (e.g., brain tissue, spinal cord tissue, nerve tissue, etc.) spanning single or multiple layers (e.g., cortical layers) of tissue and/or in relation to different types of neurons (e.g., excitatory neurons, inhibitory neurons), skeletal system biological material, muscular system biological material, respiratory system biological material, digestive system biological material, endocrine system biological material, urinary system biological material, lymphatic system biological material (e.g., spleen tissue, lymph material, tonsil tissue, etc.) spanning zone 1, zone 2, and/or zone 3 tissue, cardiovascular system biological material, integumentary system biological material, reproductive system biological material, and other biological material of a patient or subject. Anomalies can be associated with normal and diseased states, including one or more of: oncological states involving one or more of: cancer cells, circulating tumor cells, metastatic cells, benign cells, or any combination thereof.

In relation to detecting anomalies using the multimodal model described, the method 200 can further include determining that an anomaly is associated with a clinical indication. The clinical condition can be a state of health, a state of disease, a pathological state, an indeterminate state, and/or another suitable state. Determining that an anomaly is associated with a clinical indication can include processing features of the anomaly, as inputs to an embodiment, variation, or example of the model(s) described, and returning a list of candidate clinical indications (e.g., ranked indications).

Upon identification of a clinical condition from the set of images, and using representations derived from the set of images as inputs to the multimodal model, the method can further include retrieving a set of candidate actions to perform based upon the clinical indication, whereby candidate actions can include actions described above, in relation to initiating and/or administering specific treatments in response to the clinical indication(s) identified.

The methods described can, however, include any other suitable processes.

5. Conclusions

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method of using a multimodal model for generation of radiology outputs, the method comprising:
   at a computing system, receiving a request from a radiologist to retrieve a report associated with a session with a patient; and
   returning the report with a level of completion above a threshold level of completion, wherein the report is returned in a writing style of the radiologist, wherein returning the report comprises:
   training the multimodal model, comprising a language-aligned vision encoder and an adapter between the language-aligned vision encoder and a fixed large language model (LLM), wherein the adapter is structured to pass information between the language-aligned image encoder and the LLM with an attention mechanism, to generate a trained multimodal model;
   re-training the multimodal model to generate a re-trained multimodal model, wherein re-training the multimodal model comprises training only the adapter and fixing all other components of the multimodal model;
   transforming a set of images generated during the session into a set of image representations;
   returning a set of radiology outputs upon processing the set of image representations with the re-trained multimodal model, wherein the multimodal model is structured to process image-based inputs and language-based inputs;
   transforming the set of radiology outputs into the report; and
   transmitting the report to the radiologist.

2. The method of claim 1, wherein training the multimodal model comprises training the multimodal model in a first stage of training and in a second stage of training.

3. The method of claim 2, wherein the first stage of training involves a contrastive learning with language-image pre-training operation, with a contrastive loss function, structured to drive image representations and associated reports closer in a high-dimension space, and structured to drive mismatched image representations and unrelated reports, to generate a first trained representation of the multimodal model.

4. The method of claim 3, wherein the second stage of training involves training the first trained representation of the multimodal model with bootstrapping language-image pre-training architecture applied to a Q-former comprising a shared embedding space.

5. The method of claim 1, wherein returning the set of radiology outputs comprises detecting an anomaly captured in the set of images.

6. The method of claim 5, further comprising determining that the anomaly is associated with a clinical indication, wherein the anomaly comprises one of a global anomaly and a local anomaly.

7. The method of claim 6, further comprising retrieving a set of candidate actions to perform based upon the clinical indication.

8. The method of claim 7, wherein the clinical indication comprises a hemorrhage, and wherein detecting the anomaly is performed with at least 70% sensitivity and 80% specificity.

9. The method of claim 7, further comprising executing an action of the set of candidate actions, wherein the action comprises executing a critical results workflow with administration of care for treating the clinical indication.

10. The method of claim 1, wherein the writing style comprises a word choice component and a length of an impressions section of the report.

11. The method of claim 1, wherein receiving the request and returning the report is performed within a duration of 5 minutes, and wherein the threshold level of completion is 80%.

12. A method of using a multimodal model for generation of radiology outputs, the method comprising:
   training the multimodal model, comprising a language-aligned vision encoder and an adapter between the language-aligned vision encoder and a fixed large language model (LLM), wherein the adapter is structured to pass information between the language-aligned image encoder and the LLM with an attention mechanism, to generate a trained multimodal model;
   re-training the multimodal model to generate a re-trained multimodal model, wherein re-training the multimodal model comprises training only the adapter and fixing all other components of the multimodal model;
   transforming a set of images generated during a session with a patient, into a set of image representations;
   returning a set of radiology outputs upon processing the set of image representations with the re-trained multimodal model, wherein the multimodal model is structured to process image-based inputs and language-based inputs;
   detecting an anomaly captured in the set of images, using the trained multimodal model;
   determining that the anomaly is associated with a clinical indication;
   retrieving a set of candidate actions to perform based upon the clinical indication;
   transforming the set of radiology outputs into a report comprising a style and level of completion above a threshold level of completion;
   transmitting the report to the radiologist; and
   executing an action of the set of candidate actions, wherein the action comprises administering care according to a critical results workflow corresponding to the clinical indication.

13. The method of claim 12, wherein training the multimodal model involves a contrastive learning with language-image pre-training operation, with a contrastive loss function, to generate a first trained representation of the multimodal model.

14. The method of claim 12, wherein the style comprises a word choice component and a length of an impressions section of the report.

15. The method of claim 12, wherein transmitting the report in response to a request by a radiologist is performed within a duration of 2 minutes, and wherein the threshold level of completion is 90%.

* * * * *